(12) United States Patent
McAndrew et al.

(10) Patent No.: US 10,230,624 B2
(45) Date of Patent: Mar. 12, 2019

(54) USE OF A ROUTER FOR INTEGRATION OF LMR AND IP NETWORKS

(71) Applicants: Niall McAndrew, Christchurch (NZ); Emma Patricia Caunter, Christchurch (NZ); Clive Douglas Horn, Christchurch (NZ); Robert Spencer Searle, Canterbury (NZ); Alan Murray, North Canterbury (NZ)

(72) Inventors: Niall McAndrew, Christchurch (NZ); Emma Patricia Caunter, Christchurch (NZ); Clive Douglas Horn, Christchurch (NZ); Robert Spencer Searle, Canterbury (NZ); Alan Murray, North Canterbury (NZ)

(73) Assignee: TAIT INTERNATIONAL LIMITED, Harewood, Christchurch (NZ)

(*) Notice: Subject to any disclaimer, the term of this patent is extended or adjusted under 35 U.S.C. 154(b) by 0 days.

(21) Appl. No.: 14/832,420

(22) Filed: Aug. 21, 2015

(65) Prior Publication Data
US 2016/0057051 A1 Feb. 25, 2016

Related U.S. Application Data

(60) Provisional application No. 62/128,101, filed on Mar. 4, 2015, provisional application No. 62/128,129, filed on Mar. 4, 2015.

(51) Int. Cl.
*H04W 36/00* (2009.01)
*H04L 12/709* (2013.01)
(Continued)

(52) U.S. Cl.
CPC .......... *H04L 45/245* (2013.01); *H04W 8/186* (2013.01); *H04W 36/0027* (2013.01);
(Continued)

(58) Field of Classification Search
CPC .......... H04N 1/00106; H04W 84/042; H04W 28/0252; H04W 36/28; H04W 4/08; H04W 8/186; H04W 36/0009; H04W 36/0027
See application file for complete search history.

(56) References Cited

U.S. PATENT DOCUMENTS 4,670,899 A * 6/1987 Brody .................. H04W 16/06
455/436
7,839,811 B2 11/2010 Martinez
(Continued)

FOREIGN PATENT DOCUMENTS

WO WO 2011/123157 A1 10/2011
WO WO 2013/158362 A1 10/2013
(Continued)

OTHER PUBLICATIONS

Harris VIDA Solution P25$^{IP}$ System, Harris Corporation, Virginia, USA, 2010, (2 pages).
(Continued)

*Primary Examiner* — Salvador E Rivas
(74) *Attorney, Agent, or Firm* — Womble Bond Dickinson (US) LLP

(57) ABSTRACT

Integration of a land mobile radio (LMR) communications system and other wireless IP based systems such as LTE by way of a multi bearer router. The LMR system may be either trunked or conventional. The multi bearer router maintains LMR IDs and also IP addresses for base stations, multi bearer terminals and other components of the integrated system.

18 Claims, 40 Drawing Sheets

(51) Int. Cl.
  *H04W 76/15* (2018.01)
  *H04W 8/18* (2009.01)
  *H04W 36/28* (2009.01)
  *H04W 76/45* (2018.01)
  *H04W 4/08* (2009.01)
  *H04L 29/12* (2006.01)

(52) U.S. Cl.
  CPC ........... *H04W 36/28* (2013.01); *H04W 76/15* (2018.02); *H04L 61/2069* (2013.01); *H04W 4/08* (2013.01); *H04W 36/0009* (2018.08); *H04W 76/45* (2018.02)

(56) References Cited

U.S. PATENT DOCUMENTS

| | | |
|---|---|---|
| 8,233,422 B2 | 7/2012 | Martinez |
| 8,279,868 B2 | 10/2012 | Martinez et al. |
| 8,676,120 B2 | 3/2014 | Zhang et al. |
| 8,717,906 B2 | 5/2014 | Sawaguchi |
| 9,037,145 B2 | 5/2015 | Mao et al. |
| 2003/0189950 A1 | 10/2003 | Spear et al. |
| 2004/0032843 A1 | 2/2004 | Schaefer et al. |
| 2005/0073964 A1* | 4/2005 | Schmidt ............ H04L 29/06027 370/260 |
| 2006/0092865 A1* | 5/2006 | Williams .............. H04W 48/18 370/310 |
| 2006/0221912 A1 | 10/2006 | Olivier et al. |
| 2006/0221937 A1 | 10/2006 | Olivier et al. |
| 2006/0262800 A1* | 11/2006 | Martinez ............... H04W 88/06 370/395.52 |
| 2007/0173222 A1 | 7/2007 | Hansen |
| 2008/0031275 A1* | 2/2008 | Janky ................. H04W 88/181 370/466 |
| 2010/0020698 A1* | 1/2010 | Kondo ...................... H04L 1/02 370/241.1 |
| 2010/0135197 A1* | 6/2010 | Martinez ............... H04L 12/189 370/312 |
| 2012/0102097 A1* | 4/2012 | Jobe ........................ H04L 12/66 709/203 |
| 2012/0106485 A1* | 5/2012 | Roy ...................... H04W 92/02 370/329 |
| 2013/0044710 A1* | 2/2013 | Martinez ............. H04L 12/4633 370/329 |
| 2013/0171986 A1 | 7/2013 | Shimizu |
| 2015/0003315 A1* | 1/2015 | Chen ....................... H04W 4/06 370/312 |

FOREIGN PATENT DOCUMENTS

| | | | |
|---|---|---|---|
| WO | WO 2014/066007 A1 | 5/2014 | |
| WO | WO 2014/166074 A1 | 10/2014 | |

OTHER PUBLICATIONS

Harris VIDA Network Management, Harris Corporation, Virginia, USA, 2015 (2 pages).

* cited by examiner

|  | ID | IP Address | Freq (MHZ) | Mode | Channel | Grp ID | Grp Annmt Addr | Registered |
|---|---|---|---|---|---|---|---|---|
| Terminal | 123 | N/A | N/A | N/A | 9 | 17 | 22 | A4397/2CC/8A/2/1/250 |
| Smart Device | N/A | xxx.16.254.1 | N/A | N/A | N/A | N/A | N/A | N/A |
| Site/Base (Control)<br>• WACNID<br>• System ID<br>• RF Sub System ID<br>• Site ID<br>• Channel (RFPID/Channel) | A4397/2CC/8A/2/1/2500 | xxx.16.254.20 | 170 | Control | 1 | N/A | N/A | N/A |
| Base (Voice) | A4397/2CC/8B/2/1/2509 | xxx.16.254.21 | 171 | Traffic | 9 | 17 | 22 | N/A |
| Base (Voice) | A4397/2CC/8C/2/1/2510 | xxx.16.254.22 | 172 | Traffic | 10 | 18 | 23 | N/A |
| Base (Voice) | A4397/2CC/8D/2/1/2511 | xxx.16.254.23 | 173 | Traffic | 11 | 19 | 24 | N/A |

Figure 20

| Identity Table | ID | IP Address | Frequency (MHZ) | Mode | Group ID |
|---|---|---|---|---|---|
| CMBR | - | xxx.20.254.100 | - | - | - |
| Radio 1 | 123 | - | - | - | 18 |
| Smart Device 1 | - | xxx.20.254.1 | - | - | - |
| Radio 2 | 124 | - | - | - | 18 |
| Smart Device 2 | - | xxx.20.254.2 | - | - | - |
| Radio 3 | 125 | - | - | - | 17 |
| Smart Device 3 | - | xxx.20.254.3 | - | - | - |
| Radio 4 | 126 | - | - | - | 17 |
| Smart Device 4 | - | xxx.20.254.4 | - | - | - |
| Base Station | - | xxx.16.254.21 | 171 | Traffic | 17 |
| Base Station | - | xxx.16.254.22 | 172 | Traffic | 17 |
| Base Station | - | xxx.16.254.23 | 173 | Traffic | 18 |

Figure 33

| Routing Table Group | Base Station | Base Station | Smart Device | Smart Device |
|---|---|---|---|---|
| 18 | xxx.16.254.21 | xxx.16.254.22 | xxx.20.254.1 | xxx.20.254.2 |
| 17 | xxx.16.254.23 | - | xxx.20.254.3 | xxx.20.254.4 |

Figure 34

USE OF A ROUTER FOR INTEGRATION OF LMR AND IP NETWORKS

CROSS-REFERENCE TO RELATED APPLICATIONS

This application claims benefit of U.S. Provisional Application No. 62/128,101, filed Mar. 4, 2015 and U.S. Provisional Application No. 62/128,129, filed Mar. 4, 2015. This application also claims the priority of New Zealand Patent Application No. NZ629167, filed Aug. 21, 2014 and New Zealand Patent Application No. NZ700908, filed Oct. 10, 2014. The disclosure of the above applications is incorporated by reference in its entirety for all purposes.

FIELD OF THE INVENTION

This invention relates to integration of services between a land mobile radio (LMR) communications system and other wireless technology such as cellular that can offer a multi bearer terminal the relatively high data rates needed to support an IP path. In particular the invention relates to architectures which use a multi bearer router in either trunked or conventional LMR systems.

BACKGROUND TO THE INVENTION

Public safety agencies around the world typically use relatively narrow band, LMR technologies such as P25 to communicate voice information and some data traffic. Characteristics of this technology are long range and high quality voice. Today, Public Safety is considering the use of new technologies, such as LTE, capable of high rate data enabling mobile data applications. This form of technology is relatively short range compared to relatively narrow band technologies. In a move to capture the benefit of both technologies, methods of integration are being considered.

Typically, LMR systems are deployed over wide areas where public safety operation is expected including both populated and unpopulated areas. Typically, cellular systems are deployed over populated areas or areas where revenue can be generated through user traffic. There are areas where LMR exists but no cellular. There are areas where cellular exists but no LMR. There are areas where both LMR and cellular exist. Historically there have been innovations that seek to selectively communicate calls over either cellular or LMR depending upon which bearer is available.

LMR systems typically exist in two forms. The first is referred to as conventional. In this configuration a radio channel is used by a group of terminal devices where the communication is conducted by a repeater that is typically located on a physically high site. The user of the terminal will typically make a manual choice of channel number through choosing that channel via a selection knob on the terminal. Upon pressing a push to talk button on that terminal, the voice is then received by any other terminal that is configured to listen to that channel. In its simplest form, any terminal listening to the channel will unmute. This is one way of creating group communications.

Still considering conventional communications, a group can also be created according to a group identity. The group identity is normally a specific number that identifies the group. This identity is sent along with the voice information and now any terminal that is both listening to the channel and a member of this group will unmute.

The other form of system typically used in LMR is trunked. In this case, there is typically one control channel and several traffic channels. In effect, a trunked system is a centrally controlled network or trunked controller. All terminals not in a voice call will listen to the control channel. If a call is initiated then they are sent to a traffic channel. Any trunked terminal wishing to access the network must first register with the network. This represents a form of security to ensure the terminal is permitted on the network. Registration normally takes place at switch on of the terminal or when the terminal enters coverage of the control channel. All trunked terminals must register.

Following registration, all trunked terminals must then identify which groups they are a part of. This is required so that if a call for that group is initiated then all terminals in that group can be sent to the correct traffic channel. This group information (referred to as group affiliation) is knowledge held by the trunked controller.

A similar problem exists in the case of conventional radio wherein the management of groups remains a key issue when seeking to design an integrated solution across LMR and IP. Key to operation is the management of groups. Here we describe the management of groups through the interpretation of signalling and establishment of optimal routes required to maintain call quality and seamless connectivity.

Ideally, solutions are required that integrate LMR RF channels and IP capable bearers in such a way that a user is unaware of the communication bearer being used. In other words, the terminal always appears to function as a normal LMR radio whether conventional or trunked.

Previous attempts to enable LMR across a cellular network generally selects between an LMR voice call or a normal cellular call. In other words, the protocols for each path are different and only one path is chosen at any time. In some cases LMR is described in the context of tunnelling LMR information through an IP pipe. A key problem exists relating to the management of control information, path set up and seamless connectivity. Interpretation of signalling and establishment of optimal routes are required to maintain call quality and seamless connectivity.

One approach that has been used in the past is a gateway between LMR and Cellular. Methods of this type are subject to a number of draw backs including; a mismatch of audio quality on either side, an incompatible feature set on either side and loss of ability to establish end to end encryption.

The first bearer is LMR and may be P25 (APCO 25), Tetra, DMR (Digital Mobile Radio) or generally any form of relatively narrow band protocol. The second bearer may be LTE (3GPP Long Term Evolution) or Wifi or generally any form of wireless bearer capable of relatively high data rates to communicate IP packets. In an example system P25 is used as the LMR protocol. Other bearers may be present and participate.

Typically in an LMR network a channel is assigned to a call and the mobile end point of that call is an LMR terminal with a unique ID. Typically in an IP network over cellular the channel is shared by many mobile end points such as smart devices which have IP addresses. By converging these technologies we shall associate the ID of an LMR terminal with an IP address.

An LMR system is also typically Frequency Division Multiple Access (FDMA) or Time Division Multiple Access (TDMA). A channel can be defined as either, a frequency, frequency pair or time slot on a frequency or frequency pair.

SUMMARY OF THE INVENTION

It is an object of the invention to enable integration of LMR and IP capable paths in wireless communication systems. Integration typically requires routing of signals on the correct path depending upon the status of multi bearer terminal group membership, voice call assignment, or other signalling messages required for normal operation.

In one aspect the invention resides in a method of operating a router in a multi bearer radio system having an LMR wireless bearer and an IP wireless bearer. Device data is established in the router having an LMR ID and an IP address for each of a plurality of multi bearer devices in the system. Site data is also established in the router having an IP address for each of a plurality of LMR bearer base stations in the system and an IP address for each of a plurality of IP bearer base stations in the system.

The device data preferably includes a talk group ID for one or more of the multi bearer devices. In a trunked embodiment the site data includes an IP address for one or more LMR base stations which provide an LMR control channel.

In another aspect the invention resides in a method of group communication between multi bearer devices in a conventional LMR system. LMR ID, group ID and IP address information are received from the multi bearer devices, and stored in a router. Group ID and IP address information are received from traffic channel base stations in the system, and stored in the router. Group communications can then be routed between multi bearer devices in a common group according to the IP addresses of base stations which serve the multi bearer devices in the group.

Preferably the router identifies the IP addresses of the base stations through IP broadcast reports containing frequency of operation and mode.

In a further aspect the invention resides in a method of registration in a trunked LMR system. Initiating an LMR communication using a multi-bearer device capable of both LMR and IP communication, receiving broadcast information detailing the identification of the LMR system including the identity of a control channel base station, using said broadcast information to establish a header packet to enable communication to the control channel base station, transmitting said header and LMR registration content from the multi-bearer device over an IP path to a router, transmitting identifying information from each base station in the system to the router, receiving said header and LMR registration from the multi-bearer device at the router, using the identifying information from each base station and routing LMR registration to the base station serving the multi bearer device, transmitting said LMR registration from the receiving base station to a trunked controller, receiving a registration response from the trunked controller at the base station, transmitting the registration response to the router, and receiving registration response at the trunked router and transmitting this to the multi-bearer device.

Preferably the header is established through LMR broadcast information including the RFSS System Broadcast and Network Broadcast. The router also identifies the IP address of the control channel base station by receiving broadcast information regarding frequency of operation and mode of the station encapsulated in an IP packet.

In another aspect the invention resides in a trunked radio communication system for users having radio equipment which provides both LMR and IP capability. The system includes a first network of base stations which provide LMR services to the users, having a control channel base station and a trunking controller, and a second network of base stations which provide cellular IP services to the users, having a router containing a table of LMR identities and corresponding IP addresses. The control channel base station sends and receives control messages to and from users of the system through the first network, and sends and receives control messages to and from users of the system through the second network, using the router for mapping between LMR and IP message protocols. The control messages typically include requests and responses relating to registration, group affiliation and call setup.

In a voting process, messages from a user are sent to a base station serving the user in the first network, and also to a base station serving the user in the second network, and then from said base station in the second network via the router to said base station in the first network. In a handover process messages to a user are sent via a base station serving the user in the first network, and also via the router to a base station serving the user in the second network.

In a further aspect the invention resides in a conventional radio communication system for users having radio equipment which provides both LMR and IP capability. The system includes a first network of traffic channel base stations which provide LMR services to the users, and a second network of base stations which provide cellular IP services to the users, having a router containing a table of LMR identities and corresponding IP addresses. The traffic channel base stations send and receive messages to and from users of the system through the first network, and to and from users of the system through the second network, using the router for mapping between LMR and IP message protocols.

LIST OF FIGURES

Preferred embodiments of the invention will be described with respect to the accompanying drawings, of which:

FIG. 20 is an example table showing routing information.

FIG. 33 is a sample Identity table for conventional radio case.

FIG. 34 is a sample conventional Routing Table.

DESCRIPTION OF PREFERRED EMBODIMENTS

Figure 1:
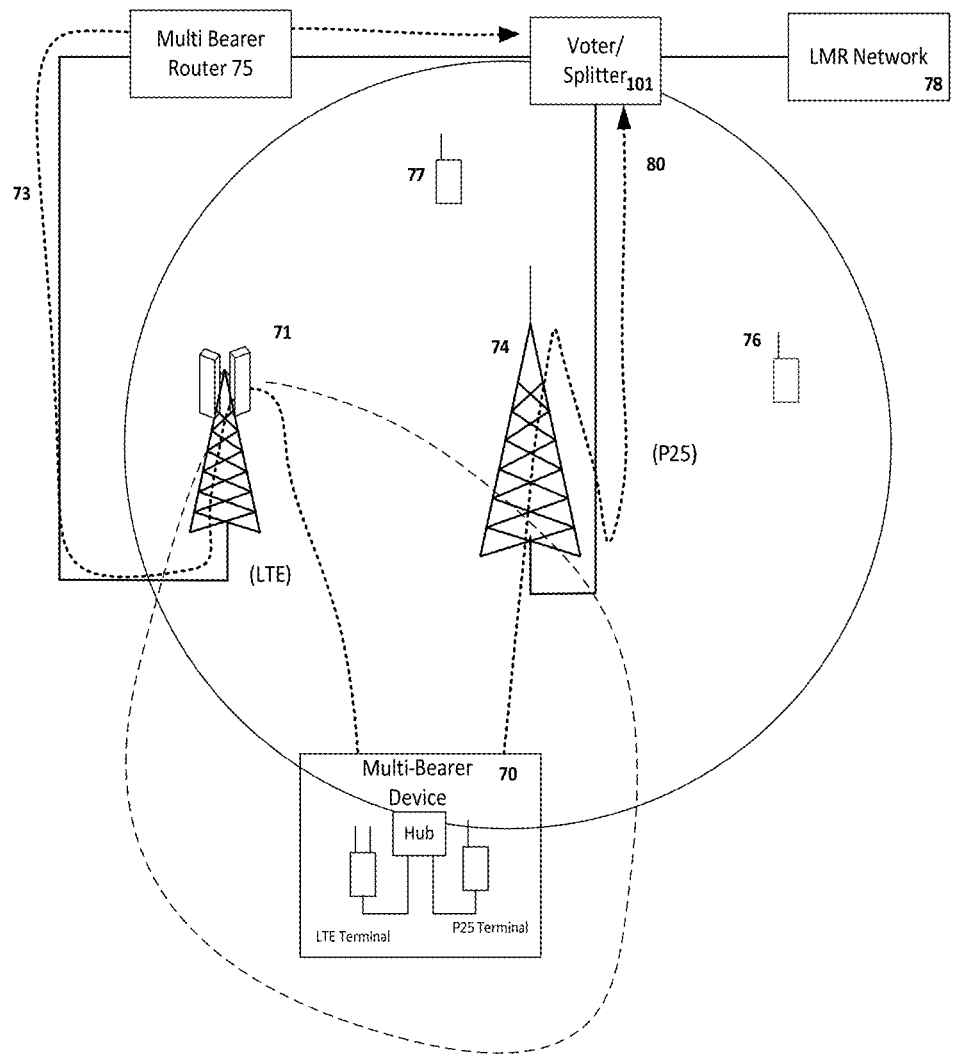
FIG. 1 is an integrated LMR and IP communication system.

Referring to the drawings it will be appreciated the invention may be performed in a variety of ways using a number of platforms that communicate LMR information across LMR RF channel and through an IP capable network. Trunked and conventional APCO P25 are described as the LMR systems in this example. In general terms any form of LMR could apply including Terrestrial Trunked Radio (TETRA), Opensky, NetworkFirst, Enhanced Digital Access Communications System (EDACS) and Digital Mobile Radio (DMR). Further, the IP capable platform may be any data capable standard which can deliver relatively high data rates to enable IP communications. Examples include 3GPP standards such as LTE as well as other standards such as 3GPP2, WiMax and WLAN.

FIG. 1 illustrates the main components of a system that integrates LMR and cellular. A multi-bearer terminal 70 includes a normal P25 terminal and an LTE (or cellular) terminal connected via a processing hub capable of processing information between these units. The multi-bearer device 70 is within the coverage area of a P25 site 74 and a broadband IP site 71. In this system all multi-bearer terminals have an IP address which becomes associated with an LMR ID of the P25 terminal in a multi bearer router 75. The multi-bearer device 70 is capable of trunked P25 operation over either standard P25 RF coverage or through an IP path which in this case is facilitated through a cellular connection. The multi-bearer device can send LMR information via standard P25 RF or through the IP path over cellular or via both. Other P25 terminals 76 and 77 or multi bearer terminals will also usually be present.

A voter/splitter 101 is typically located within a base station associated with site 74, and is capable of either receiving and selecting between multiple uplink paths, or is capable of splitting paths to send information via multiple paths on the downlink. The voter can be implemented in a number of locations. Further, the operation of the base station is controlled by a P25 trunked controller which forms of the LMR network 78, and may be used for either control channel or traffic channel operation. The voter is capable of accepting multiple IP or RF input although only one RF and one IP pipe are described here.

Figure 2:
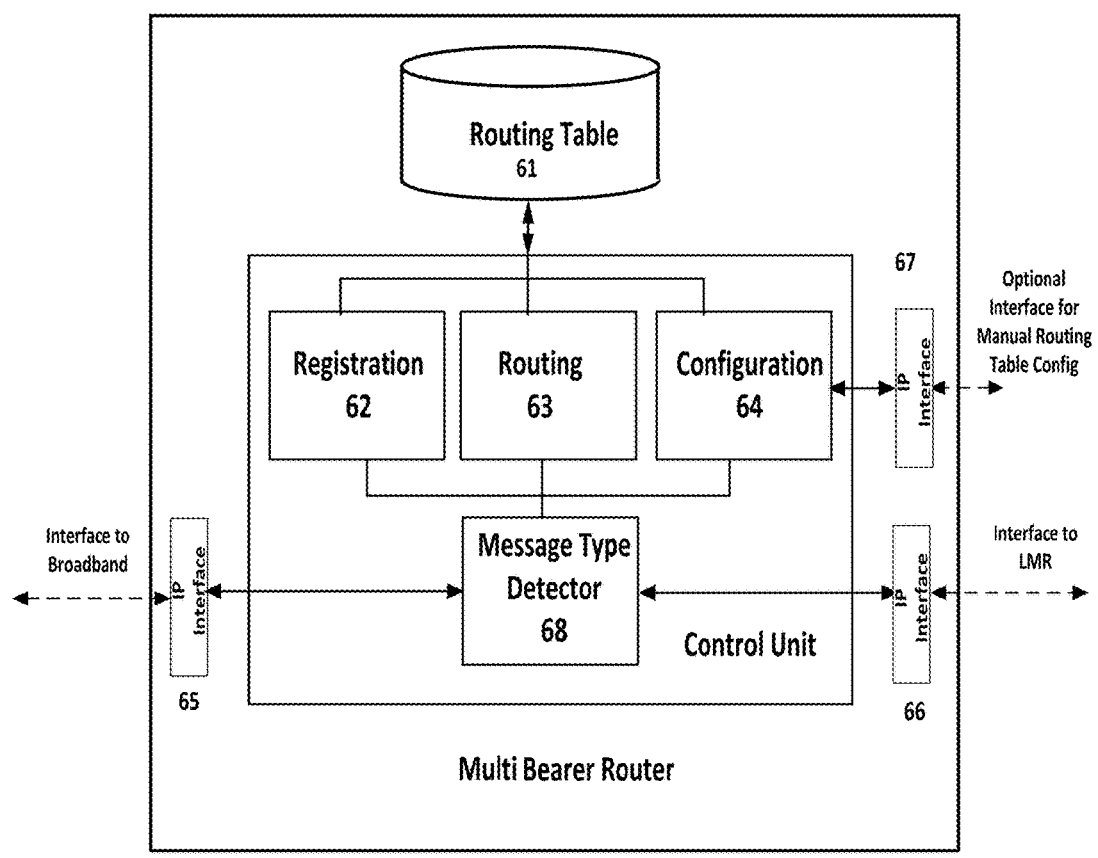
FIG. 2 is a multi bearer router MBR.

FIG. 2 shows the structure of a typical multi bearer router 75 in FIG. 1. The router contains a processor and memory which provide various functions, enabled by software instructions and data which are stored in the memory. These functions include maintenance of a routing table 61, registration 62 of multi bearer terminals 70, routing 63 of message packets between LMR and IP networks, and configuration 64 of these functions. Respective interfaces 65 and 66 are provided for connection to the LMR and IP networks. A further interface 67 may be provided for manual configuration of the router. A detector 68 determines whether an incoming message is in an LMR or IP protocol.

Figure 3:
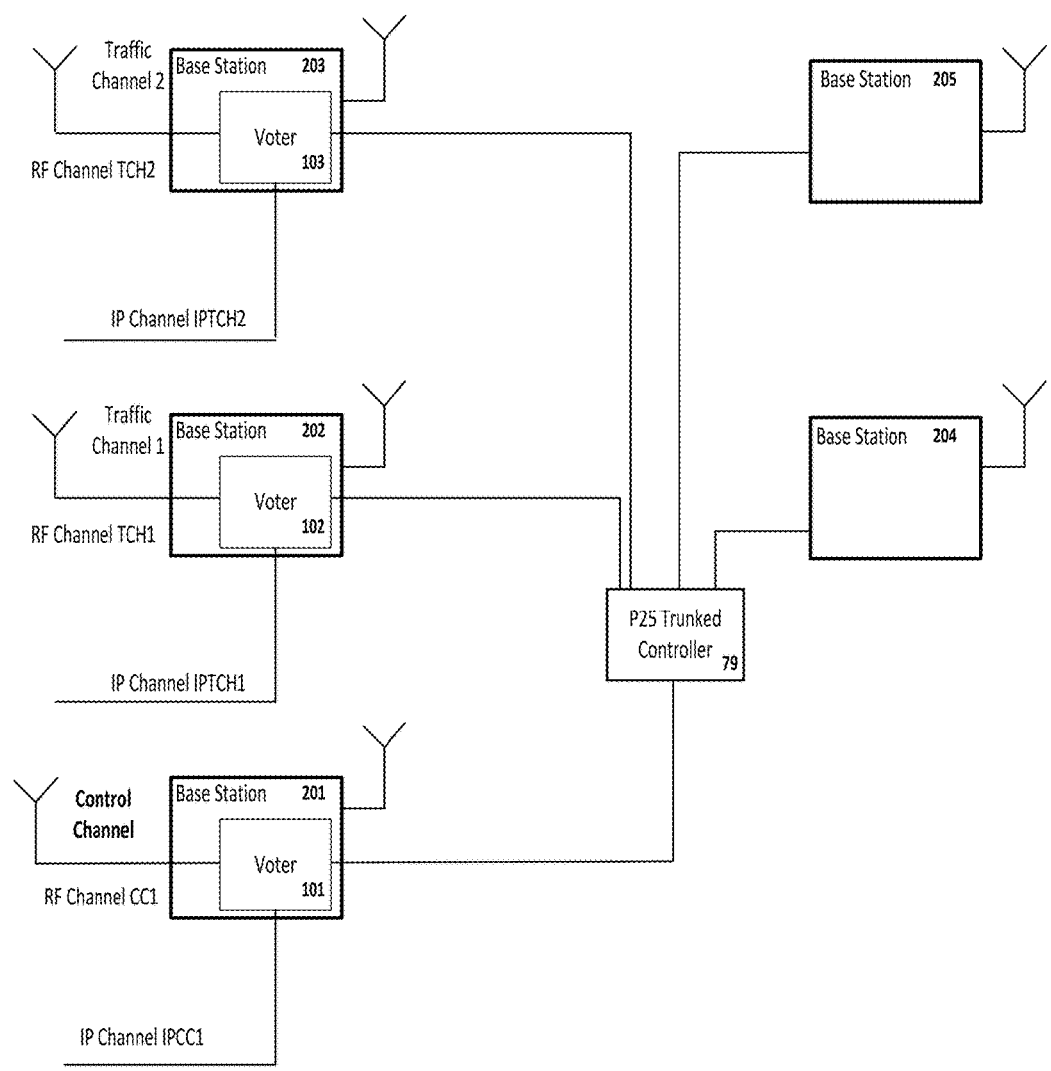
FIG. 3 is an overview of a trunked system containing voters.

FIG. 3 shows components of a trunked P25 system. Base station 201 represents a control channel in the trunked system and contains a voter 101 which is capable of receiving messages via either a standard RF path, identified as RF channel CC1 or through an IP path identified as IP channel IPCC1. Both paths enter the voter and messages are selected to pass on to the P25 trunked controller 79. Conversely the trunked controller may send messages to the voter 101 which creates copies of each message to send over either CC1 or IPCC1.

The P25 trunked controller 79 is a central point through which all trunked calls pass. The controller is also able to control other base stations for the purpose of allocating user traffic to those channels. Base stations 202 and 203 represent examples of base stations available for traffic and would typically be present at the same site 74. Each base station contains a voter 102 and 103 respectively which are able to receive traffic via either RF and IP paths. In the case of base station 202, these channels are identified as RF Channel TCH1 and IP channel IPTCH1. On the uplink the voter 102 will select messages between each path and on the downlink it can receive messages from another source, and repeat that on both TCH1 and IPTCH1 on the downlink.

The output of the voter are winning packets 102 is sent to the P25 trunked controller and may be onto another base station or end point elsewhere in the system where upon the traffic is either repeated over RF or other bearers or consumed at that point.

Figure 4:
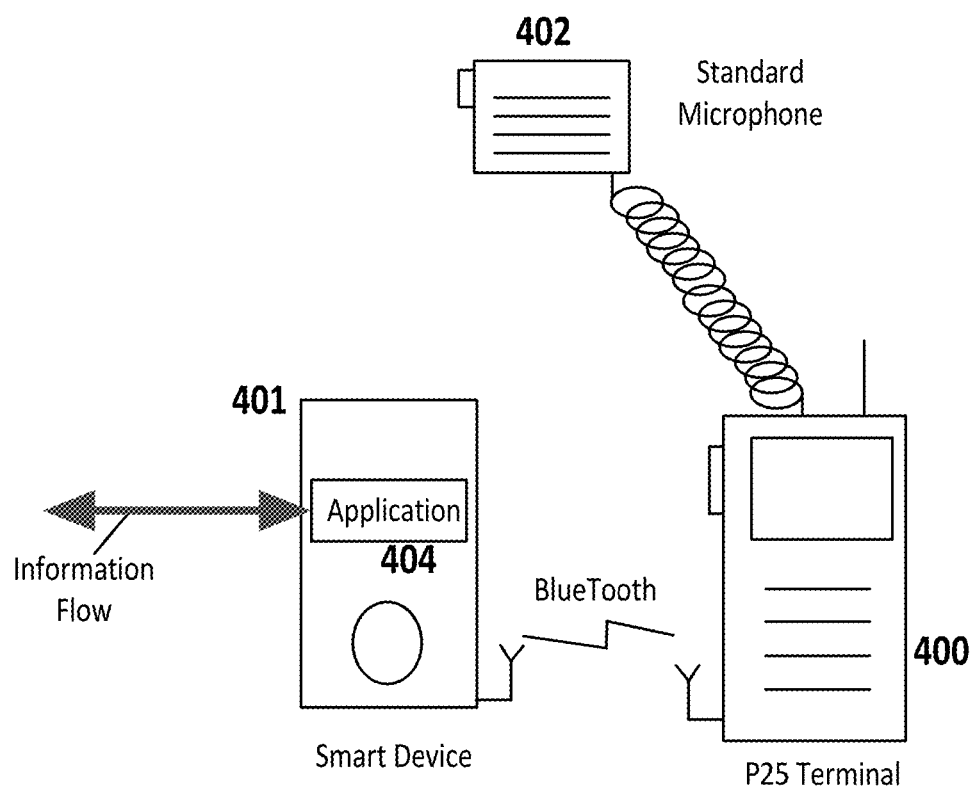
FIG. 4 shows a possible implementation of a multi bearer terminal.

FIG. 4 shows one possible realisation of the multi-bearer device 70, or MBR. In this case a standard P25 terminal 400 is connected via Bluetooth to a smart device which has a special application 404 designed to pair with the P25 terminal and preferentially process messages from the terminal. In this case a standard microphone 402 is also attached to the terminal. The multi-bearer hub can be realised in a number of ways using a number of standard interfaces including WLAN. Other examples might include using a smart microphone which pairs with the smart device. Another example may be a mobile station which uses a standard serial port to connect with a suitable processing platform that may be a smart device. A smart device containing a software P25 terminal might also be used.

Figure 5:
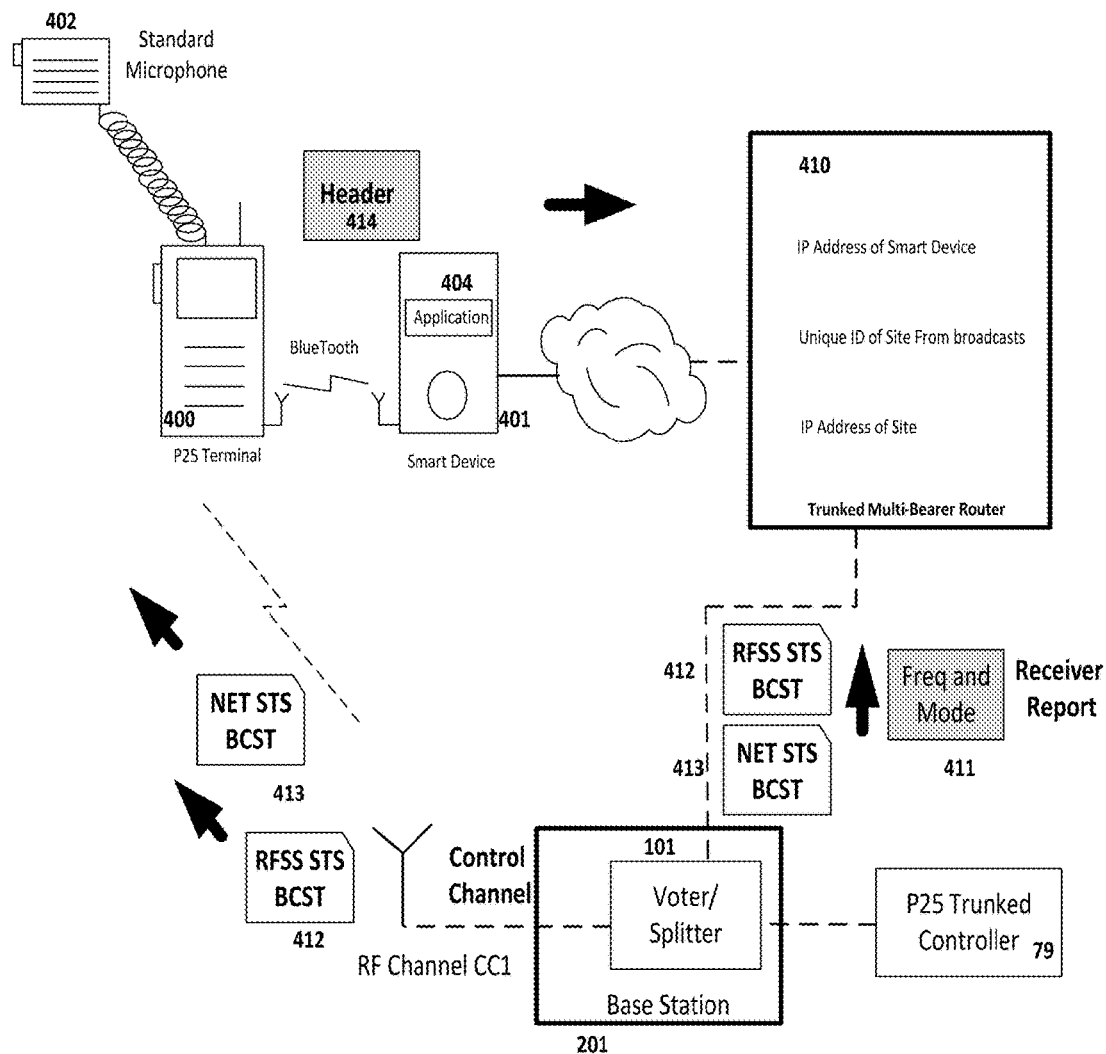
FIG. 5 shows Network Broadcast Information and determining ID of control channel.

FIG. 5 shows information that is typically broadcast within a P25 system. In a typical P25 system, the following messages are broadcast over RF by the control channel CCI via base station 201 A Network System Broadcast message (NET SYS BCST) and Radio Frequency Subsystem Broadcast (RFSS STS BCST) are broadcast by the control channel. Together they give a receiving terminal all the information needed to uniquely identify the base station from which the control channel broadcast is occurring. Identification is typically facilitated through combination of the Wide Area Communications Network ID (WACND), System ID, RF Sub system Hi) Site IM and Channel Typically a terminal would respond by RE on the control channel frequency identified by the channel number to send messages to the control channel and through that the trunked controller 79.

If a terminal 400 is unable to respond via the RF channel then it can instead respond by an IP path facilitated through the pairing with an associated smart device 401. Key to this response however is the identification of the control channel base station 201 so that messages can be routed correctly. Preferentially, the unique ID of the control channel base station is used to create a message header 414 that the application 404 on smart device 401 can use to identify the correct control channel. This header facilitates routing of messages to the correct control channel base station. When the header is sent over the IP path then the IP address of the sender is also known. In this case it represents the IP address of the smart device. This header represents information needed to route between a terminal 400 and the control channel base station 201, including WACNID, System ID, RF Sub System ID, Site ID, Channel. The header is stored within the application 404 operating on smart device 401. In another form, the header information could be stored within the multi bearer router and simply referenced via the IP address of smart device 401.

The base station 201 not only sends RFSS and NET messages via RF but simultaneously sends these messages over an IP network to all other nodes on that network. This is facilitated by the voter/splitter 101 which automatically repeats signals on both RF and IP when coming from the trunked controller 79. These messages are sent by the base station over the IP network which means a receiving node acquires both the messages and the IP address of the base station 201. The multi bearer router has the IP address of the smart device 401 associated with the terminal, the IP address and unique P25 ID of the control channel base station 201. Given this information the MBR can route messages via IP between the control channel base station 201 and the terminal 400.

A Receiver Report message is preferentially broadcast over the IP network only, in this case sent from the base station 201. This message identifies the operating frequency of the base station 201 and the mode of the base station as either Control Channel or Traffic Channel, and. is periodically sent by all base stations on the network. These messages are received by the MBR which is aware of the mode and frequency of each base station on the system. Focusing in particular on the mode, it means the MBR knows which of the base stations represent control channels. Given this knowledge, the MBR can listen and process only those messages emanating from the control channels or traffic channels that have been allocated for use at that time. This means the process requirement of the MBR can be scaled according to the current level of activity on the network.

Figure 6:
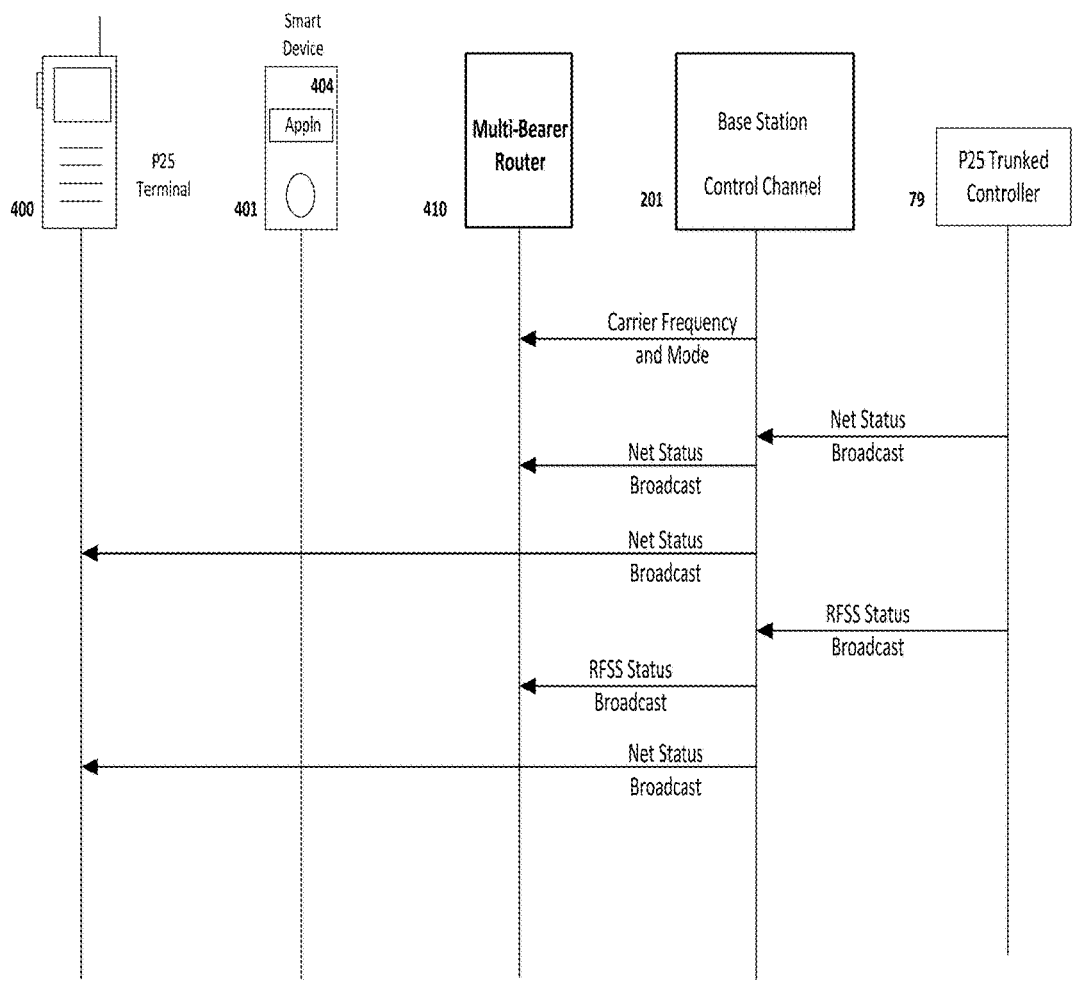
FIG. 6 is a sequence diagram illustrating the broadcast and reception of network information.

FIG. 6 is a sequence diagram for the broadcast of system information. The base station 201 periodically broadcasts over the IP network, the Receiver Report containing the frequency and mode of the base station. The Receiver Report is received by the MBR and used to start building a table of relevant information for message routing. The NET STS BCST is sent from the trunked controller 79 to the base station 201. The base station 201 repeats this via RF and IP. It is received by the terminal via RF and received by the MBR via IP. Again the information is used to build up a table to facilitate message routing. Finally, the RFSS STS BCST is sent by trunked controller 79 to the base station 201 which repeats this over RF and IP. The terminal 400 receives the message by RF and the MBR receives it via IP and uses the information to start establishing a table for routing messages.

Figure 7:
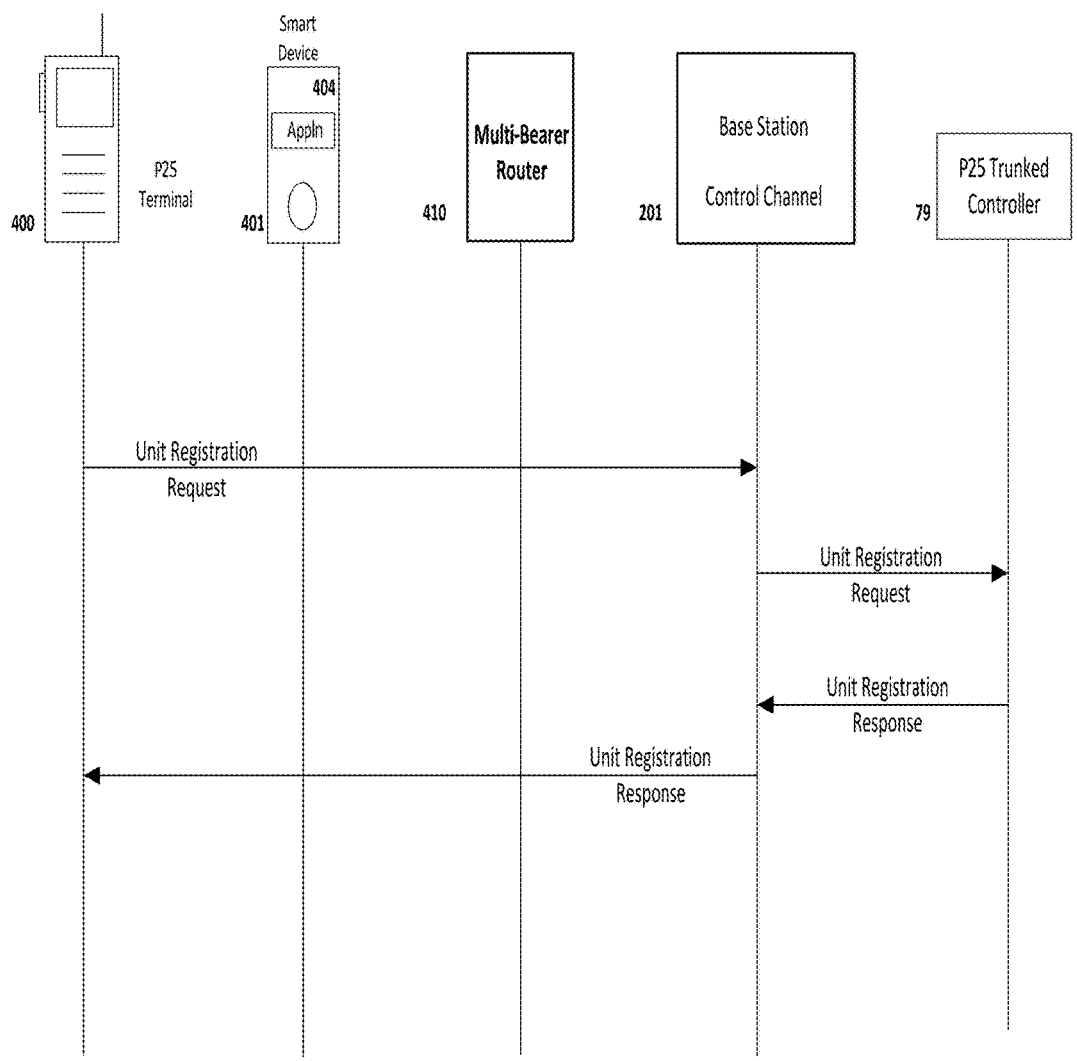
FIG. 7 is a sequence diagram showing a registration process via RF.

FIG. 7 indicates a process for terminal registration, namely the normal process that occurs via RF as a reference for further explanation. The terminal 400 sends a unit registration request 421 on the carrier frequency of the control channel base station 201.

It is received and passed onto the trunked controller 79. If the terminal is permitted on the system then the trunked controller sends back a unit registration response to the base station which sends it over RF to the terminal. In response, if accepted, the trunked controller 79 sends the unit registration response back to the base station 201 which repeats it over RF and is received by the terminal 400.

Figure 8:
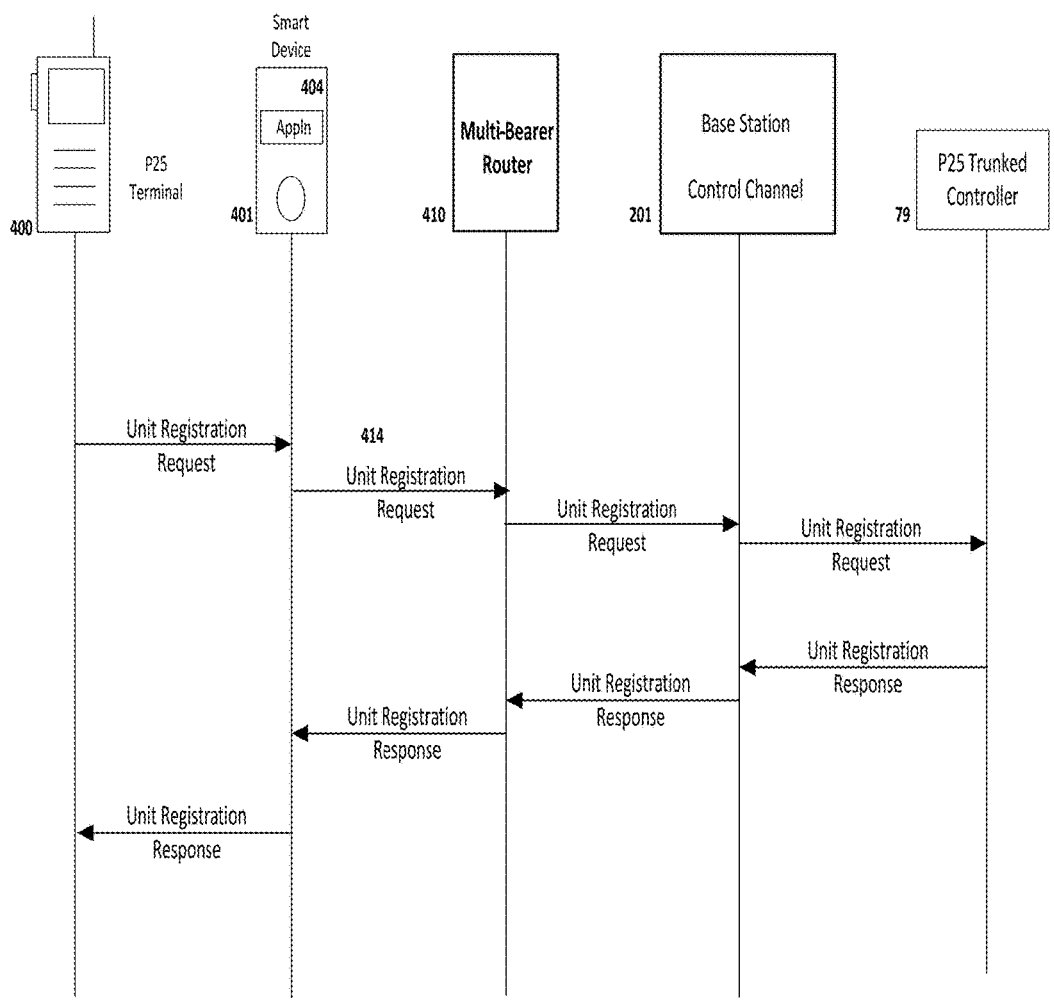
FIG. 8 is a sequence diagram showing a process of registration via IP using a header established by RF reception.

FIG. 8 indicates a process by which the terminal 400 can undertake registration via the IP path. In this case the terminal has already detected the broadcast information needed to uniquely identify the control channel base station which it should communicate with. The terminal 400 sends the unit registration request to the application 404 which is resident on the associated smart device 401. The application 404 has already assembled a header as detailed earlier. The application 404 sends a message to the MBR containing its IP address and the header 414 and the unit registration request 421. Upon arrival at the MBR the message is routed to the base station 201 with voter 101. This routing is facilitated by a routing table in the MBR which knows the terminal ID, the IP address of the associated smart device, the IP address of the control channel base station and its P25 unique ID. Upon arrival at the voter 101, it is passed onto the trunked controller. The terminal 400 may transmit RF also carrying the unit registration request. The voter would select one copy of the message or the other and pass it to the P25 trunked controller. In this case we have assumed the P25 terminal has either not transmitted over RF to save resources or the device is out of range. Upon reception of the message, the trunked controller responds with a unit registration response which is routed back to the terminal via the MBR. The base station may transmit the same message by RF.

Figure 9:
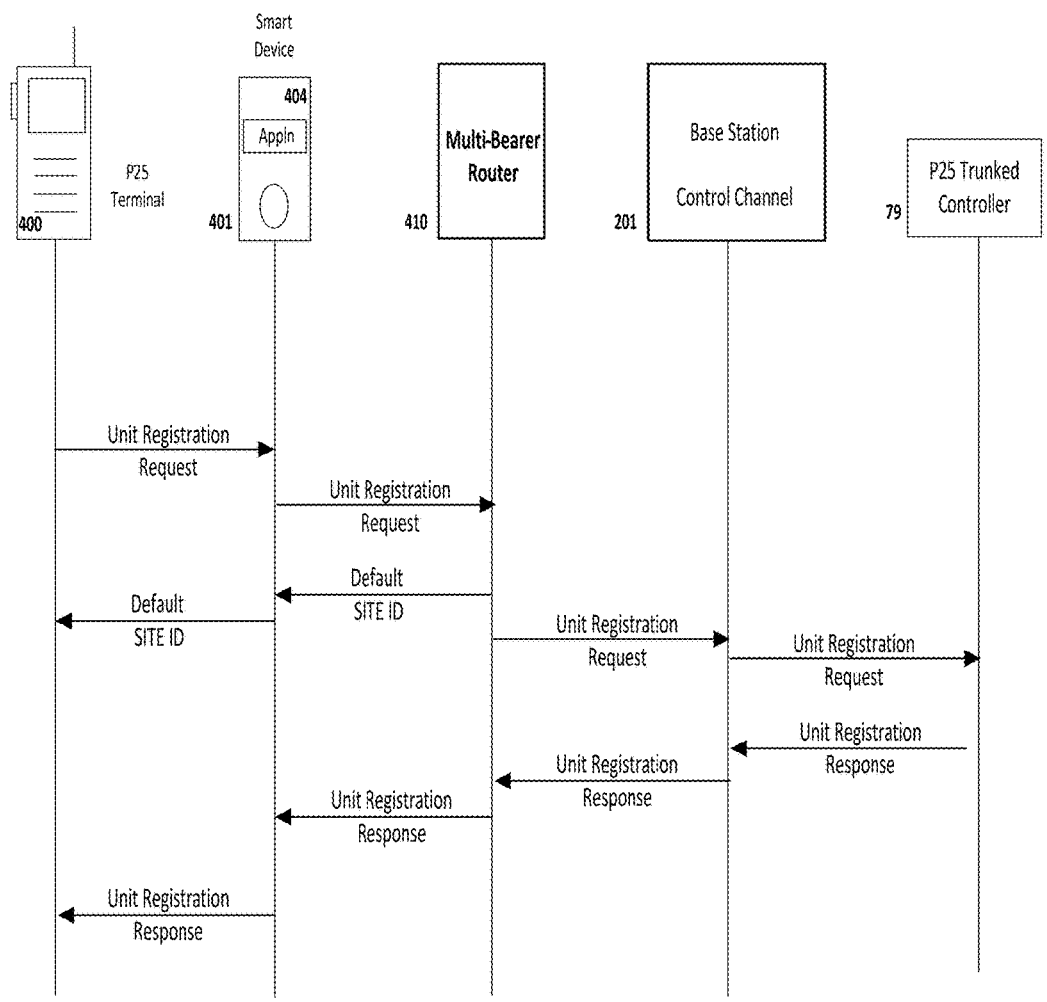
FIG. 9 is a sequence diagram showing a process of registration via IP.

FIG. 9 indicates an example of registration when a multi bearer terminal has not seen any broadcast information via RF. In this case, the terminal does not know the address or frequency of a control channel base station with which to communicate. The application 404 operating on smart device 401 will have no header prepared. In the event of the terminal seeing no broadcast information, it can still send a Unit Registration Request to the application 404 even though the WACNID and system ID may be unknown. In this case, the application will not add a header but just send the unit registration request 421 directly to the MBR. If the MBR receives a unit registration request without a header then it sends it to a default control channel base station. In this case we assume the default is 201 in which case the message is sent onto P25 trunked controller 79. The controller responds with a unit registration response which is routed back to the terminal. The terminal is now registered via the default control channel base station even though it can see no RF channels. In an alternative form, rather than routing to a default control channel base station, the MBR may route to the last known control channel base station via which the terminal was registered. Alternatively, it could use location information to identify the closest physical control channel base station to the terminal current location.

Figure 10:
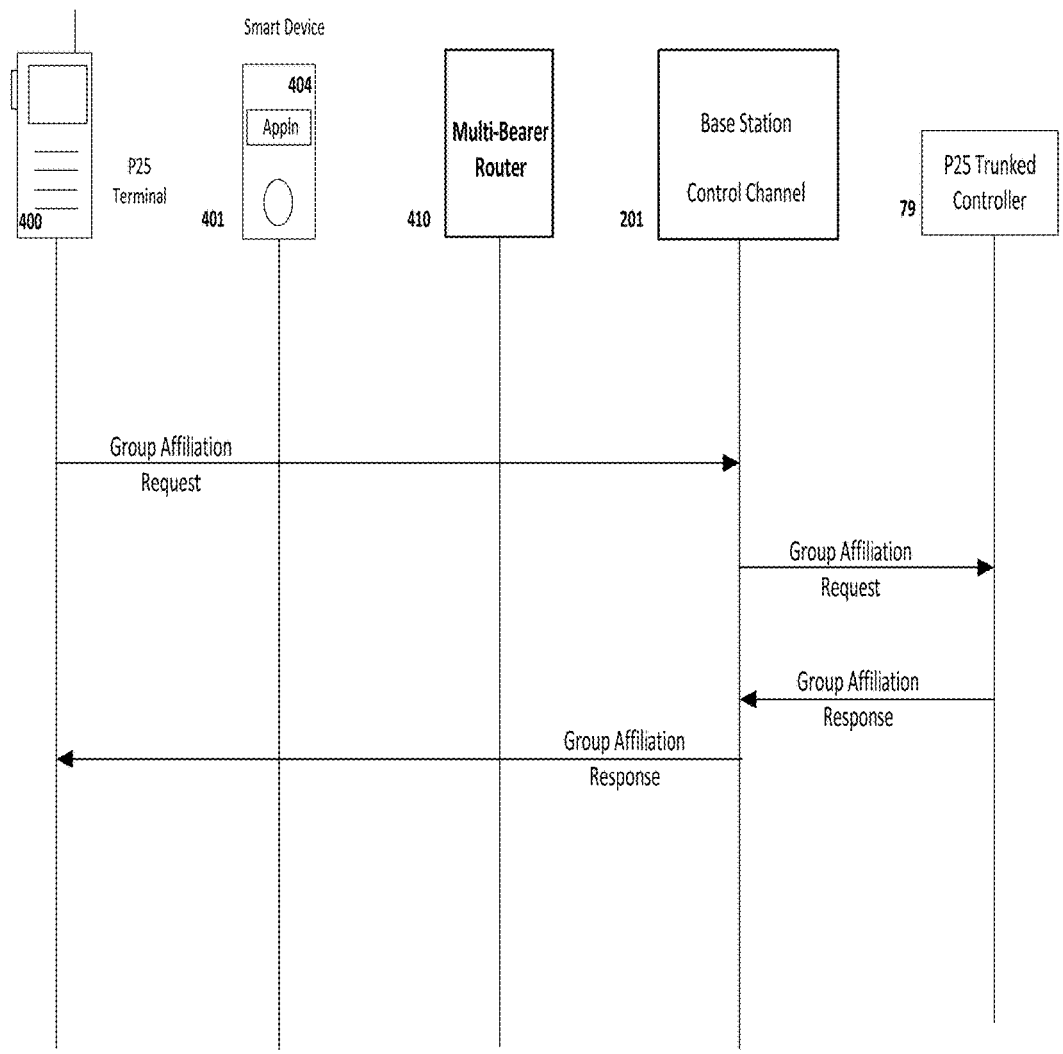
FIG. 10 is a sequence diagram showing a process for Group Affiliation via RF.

FIG. 10 shows the normal method of group affiliation. The terminal 400 will send a group affiliation request on the control channel uplink to the base station 201. The base station will then send it onto the trunked controller. The trunked controller 79 will then send a group affiliation response to the base station 201 that transmits this over the P25 RF interface on control channel CC1. It is received at the terminal 400 and assuming the request was accepted, the terminal is now affiliated with that group.

Figure 11:
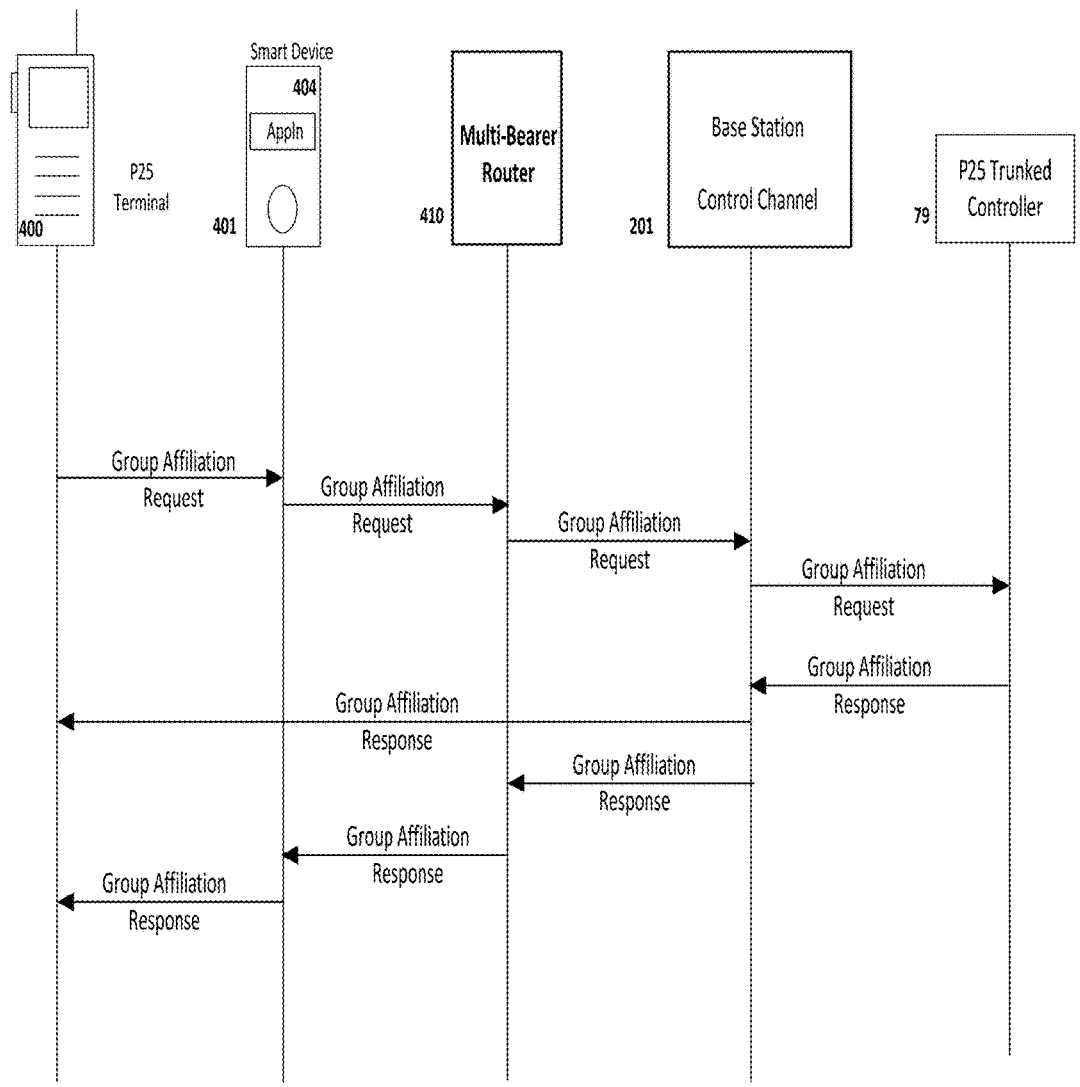
FIG. 11 is a sequence diagram showing a process for group affiliation via IP.

FIG. 11 shows how a terminal can establish group affiliation via the IP path. A prerequisite for attempting group affiliation is the terminal must be registered. If the terminal is registered then, the application 404 must have established the information needed to create a header. Upon the terminal 400 sending a group affiliation request to the application 404, the application packages a header and a group affiliation request in an IP packet and sends this to the MBR 410. The MBR now sends this message onto the base station 201 which sends it onto the trunked P25 controller 79. The controller responds with a group affiliation response which is sent to the base station 201. The base station retransmits this via IP and optionally via RF. Via the IP path it arrives at the MBR. The MBR knows which terminal sent the request and which group it was seeking to join, so is able to send the group affiliation response back to the correct application 404 which then passes it to the terminal 400. If the group affiliation request is accepted then the terminal is now affiliated to that group and will receive messages destined for that group. The MBR adds the group affiliation to its table so that further messages destined for this group are correctly sent to members of the group.

Figure 12:
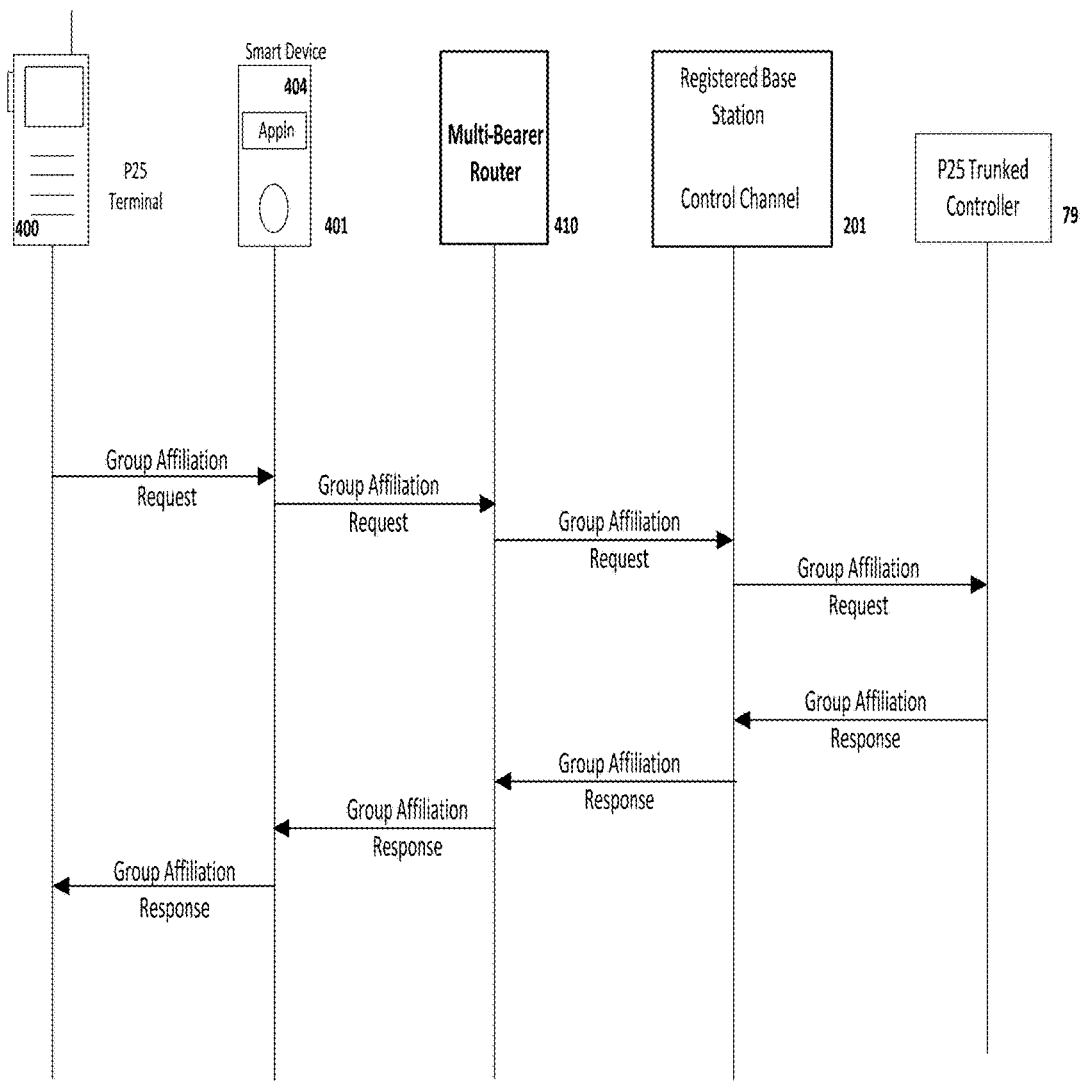
FIG. 12 is a sequence diagram showing a process for group affiliation via IP.

FIG. 12 shows a process for group affiliation in the absence of any RF. If the terminal has only registered via IP then it will have the default control channel base station ID. It will use that to create the message header. This header along with the group affiliation request is sent to the MBR 410. Given the known association between the control channel base station ID and its IP address this message is sent onto the base station 201. Base station 201 sends this onto the trunked controller 79 which responds with a group affiliation response. The group affiliation response is sent from base station 201 to the MBR 410. The MBR extracts the group information an terminal ID to add to the routing table before sending the message onto the smart device 401 running app 404. It is then sent to the terminal 400.

Figure 13:
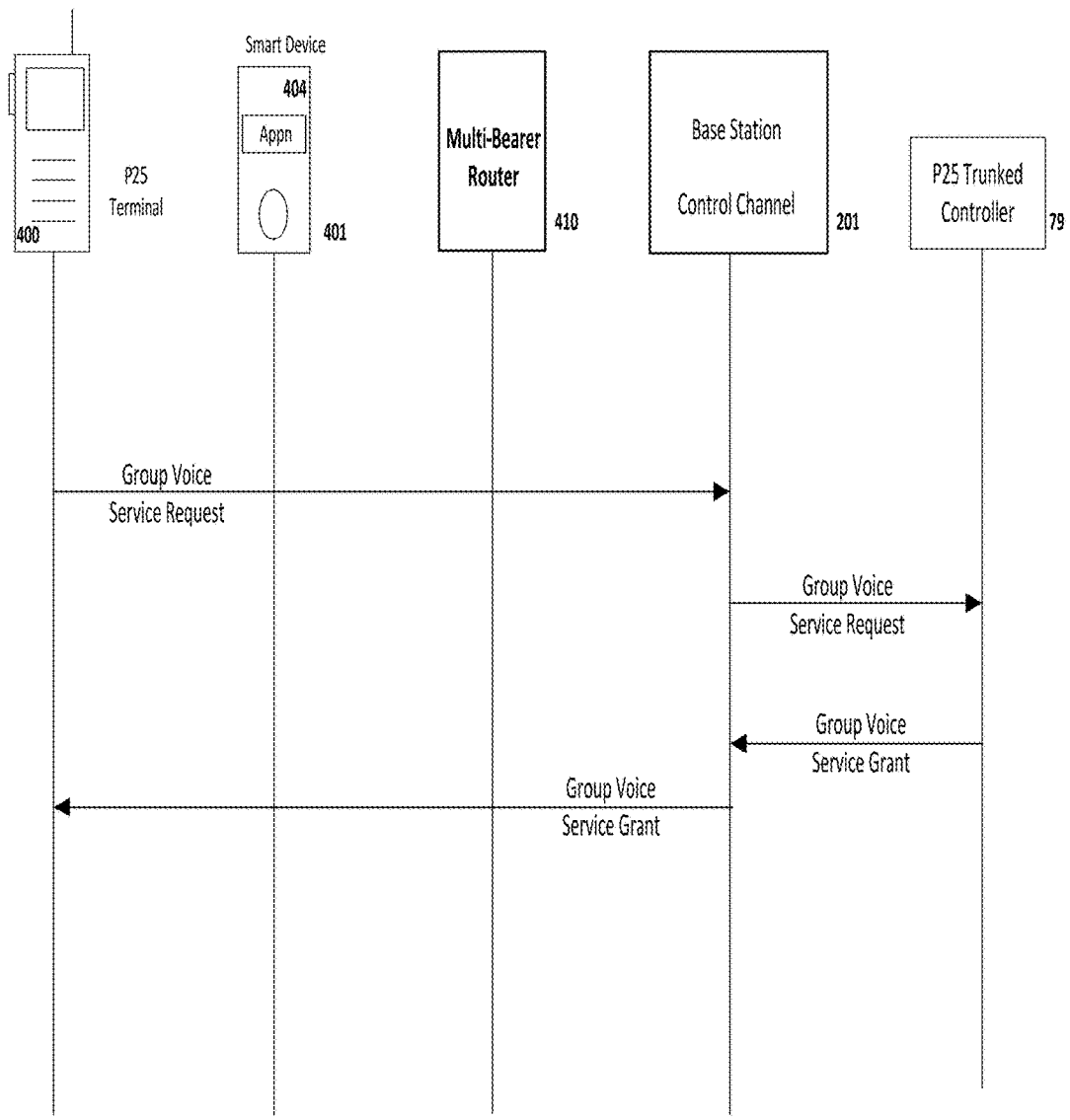
FIG. 13 is a sequence diagram showing a process for establishing a voice call via RF.

FIG. 13 shows the process by which a multi bearer terminal will establish a voice call normally. To undertake this, the terminal must already be registered and must already have affiliated with whichever groups are of interest. The terminal sends a Channel request on the control channel uplink to the base station 201. The base station passes this message onto the trunked controller 79. The trunked controller responds with a Channel Grant that can be interpreted using the information contained within an Identity Update which is periodically broadcast by the control channel. Specifically the information within the Identity update is needed to calculate the operating frequency of the assigned traffic channel. The assigned traffic channel is given in the channel grant. These are sent to the base station 201 and then repeated over RF for the terminal to receive. If the request for a voice channel is granted then the terminal will be assigned to a traffic channel, in this case the options are TCH 1 or TCH 2 operating on base stations 202 or 203 respectively.

The channel grant and identify update uniquely identify the frequency to which the terminal should go for communicating its voice traffic. The key equation a terminal would use to identify the traffic channel is it sent to is defined in the TIA specification TIA102.AABC-C Trunked control channel message section 2.3.9.2. This equation is given by $Rx=(Base\ Frequency)+(Channel\ Number)\times(Channel\ Spacing)$, where Rx is the receiver frequency for that traffic channel. The information needed for the terminal to calculate this frequency is contained within the channel grant and identify update messaged. As we shall see in subsequent figures, the TMBR can use this equation to identify the unique ID of the control channel and from that its IP address as opposed to frequency.

Figure 14:
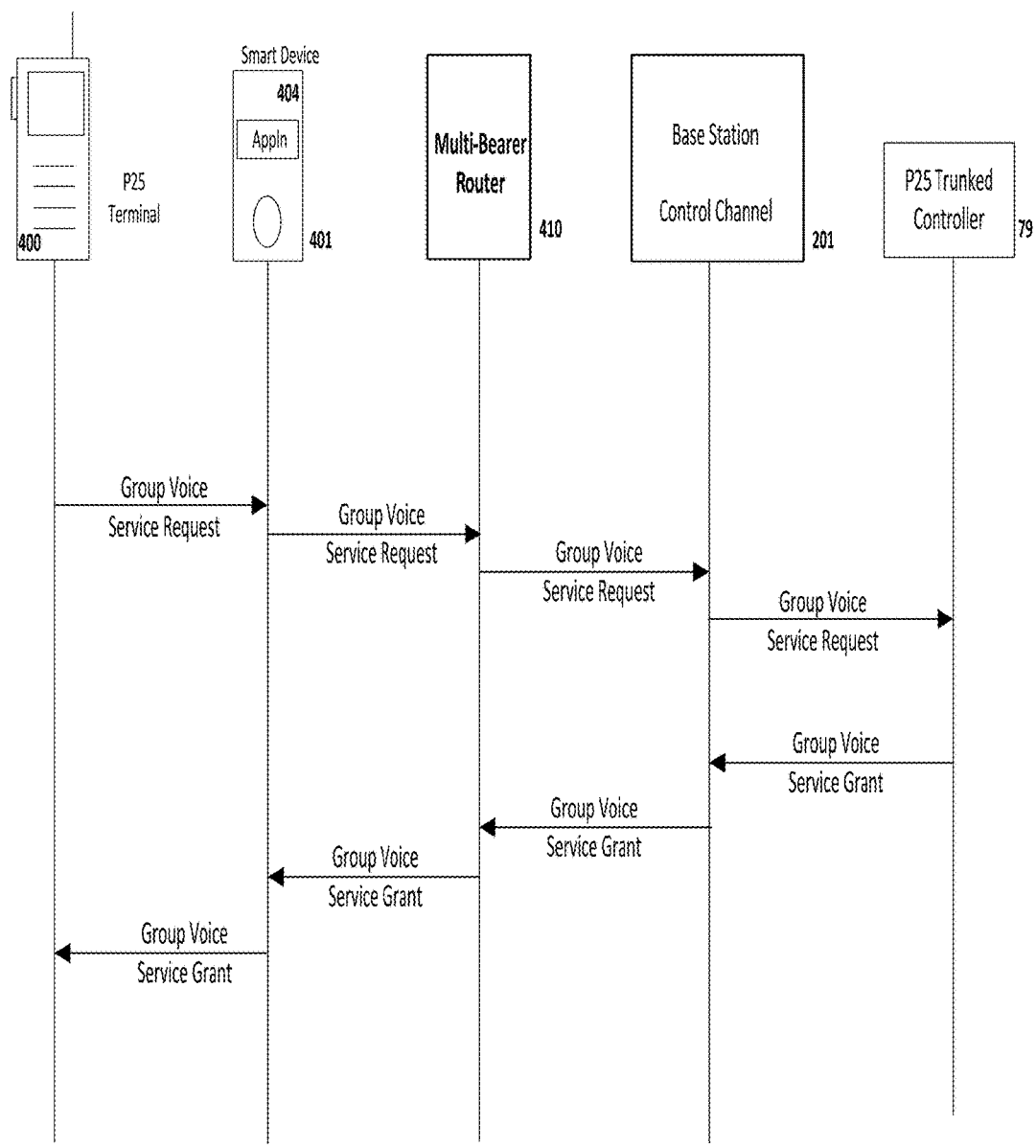
FIG. 14 is a sequence diagram showing a process for establishing a voice call via IP when the terminal is registered.

FIG. 14 shows a process for establishing a voice call via IP. In this case, the terminal 400 sends a channel request (Group Voice service request) to the application 404 operating on the smart device connected to the terminal 400. The application adds a header which identifies the control channel base station to which the request is destined for. The combined message is are packaged in an IP packet and transmitted to the MBR 410. The TMBR extracts the unique ID of the control channel base station and looks up the IP address of that base station, in this case 201. The message is sent onto 201 which passes it to the trunked controller 79. The trunked controller responds with a channel grant (Group voice service grant) and identify update which is sent to the base station 201. The base station 201 sends this message over the IP path to the MBR. The base station optionally sends the message over the RF interface as well. Upon reception of the message the MBR, 410 looks at the table to match the ID of the terminal against the know IP address of the associated smart device and sends the message to the smart device 401 to be read by the application 404. The application 404 unpacks the message and sends the channel grant and the identify update onto the terminal via a suitable digital interface.

Figure 15:
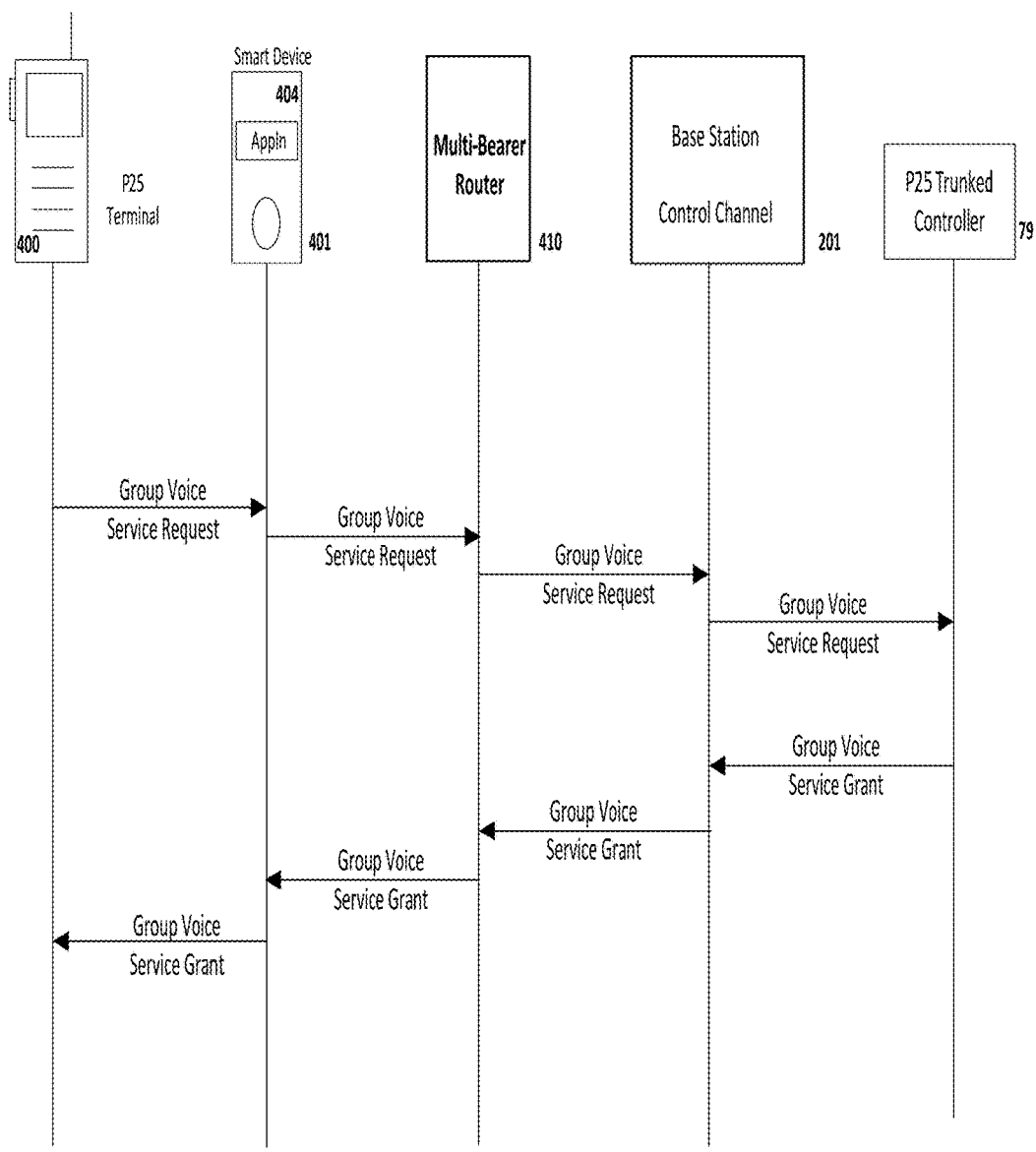
FIG. 15 is a sequence diagram showing a process for establishing a voice call via IP when the terminal is registered.

FIG. 15 indicates an example of voice call setup where there is no RF connection at all. The device must already be registered which means the control channel base station ID will be known enabling the creation of a message header. This header is packaged with the voice channel request and sent in an IP packet to the MBR 410 which reads the message and uses the header to route the message to the control channel base station 201. The control channel base station 201 sends that onto the P25 trunked controller 79. The trunked controller responds with a channel grant and identity update. This is sent from the base station 201 to the MBR 410 which extracts the channel information, base frequency and channel spacing. This is used to calculate the operating frequency of the traffic channel to which the call can been assigned. The TMBR also extracts the group ID as this is needed to establish which terminals should have the call routed to it.

Figure 16:
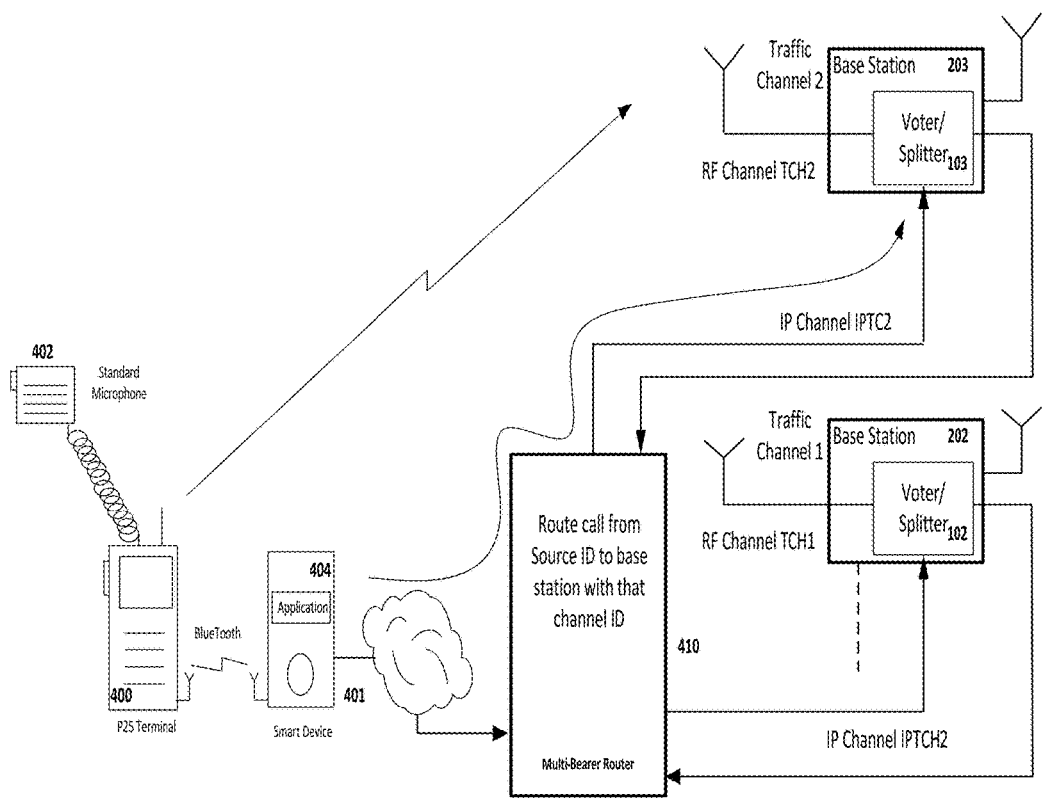
FIG. 16 is an illustration of Uplink voice communication using both paths.

FIG. 16 illustrates the operation of a voice call on the uplink. Transmission via the RF path is normal operation. In this case the terminal has been allocated to TCH2 which is associated with base station 203. Recall however that all base stations are transmitting a Receiver report which includes the IP address of the sender, the mode of the sender and the operating frequency of the sender. This message is received by the MBR and used to update its routing table.

Further, when a Group voice service grant and identify update are sent to a terminal, they contain the channel number to which they are assigned. These messages contain the required information to establish the operating frequency of the traffic channel. Specifically they contain, Base Frequency, Channel Number and Channel Spacing. Given these values and the equation as defined in TIA 102.AABC-C section 2.3.9.2, the operating frequency can be calculated as follows;

$$Frequency=(Base\ Frequency)+((Channel\ Number)\times(Channel\ Spacing)).$$

Given the frequency of the traffic channel from the RFSS and NET messages and also knowing the operating frequency and mode of each base station from the Receiver reports the MBR can identify the IP address of the base station to which the call has been assigned. Further, the MBR knows the group affiliation of each terminal. Given the IP address of the base station 203 being used for the voice traffic is now known as is the group affiliation, the MBR can now route call information from the terminal 400 to the base station 203.

Base station 203 now receives voice packets from the terminal 400 via both RF and IP path; the voter contained within the base station 203 selects the best packets from either path and sends them on to the destination. If some terminals are only connected via IP then the destination may include the MBR which will distribute information on the downlink to all members of the group.

Figure 17:
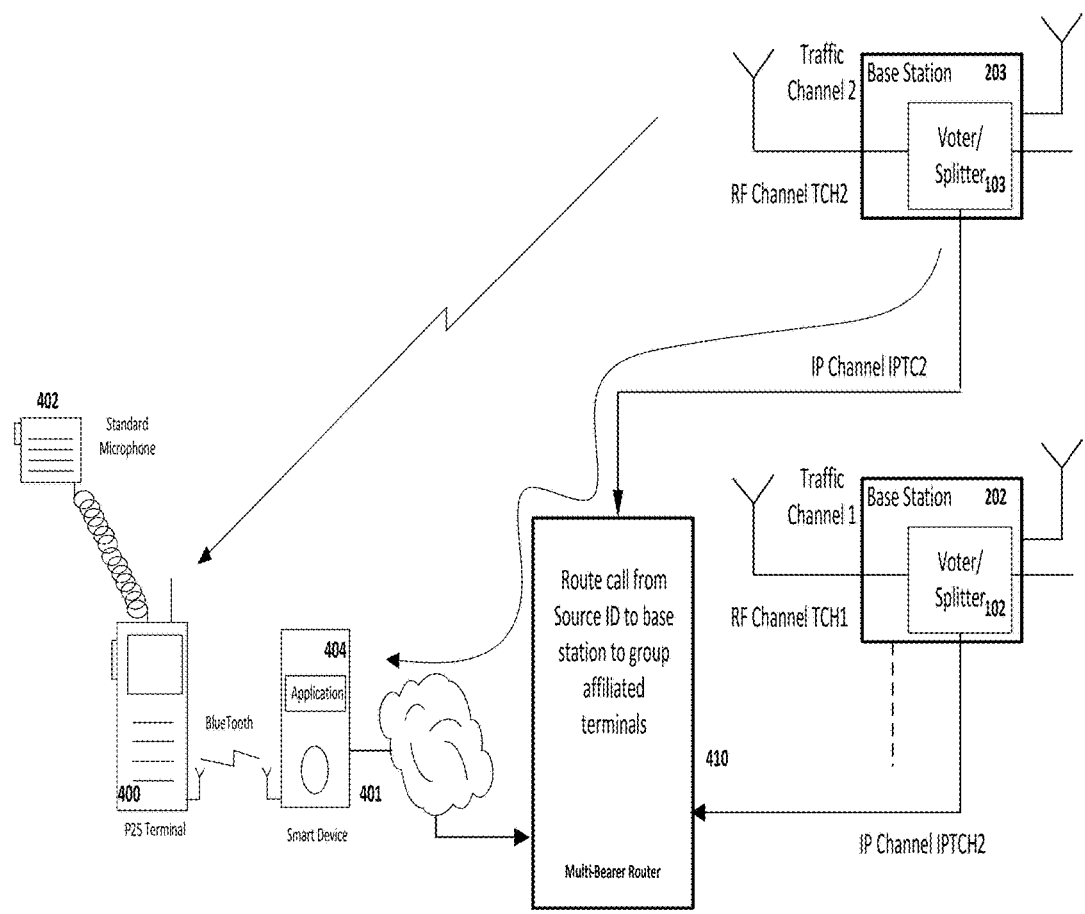
FIG. 17 is an illustration of Downlink voice communication using both paths.

FIG. 17 shows a voice call on the downlink path. The base station 203 is receiving voice from another source which we shall assume is affiliated to the same group as terminal 400. The base station 203 transmits the information over the RF path as normal which means group members on the RF channel will receive it as normal. Simultaneously base station 203 sends the same information over the IP path which is received by the MBR 410. The MBR is aware of all group members and IP addresses of terminals associated with this group on this channel. It routes the voice message to all smart devices associated with the group. The application 404 on each smart device passes the voice to the associated P25 terminal.

Figure 18:
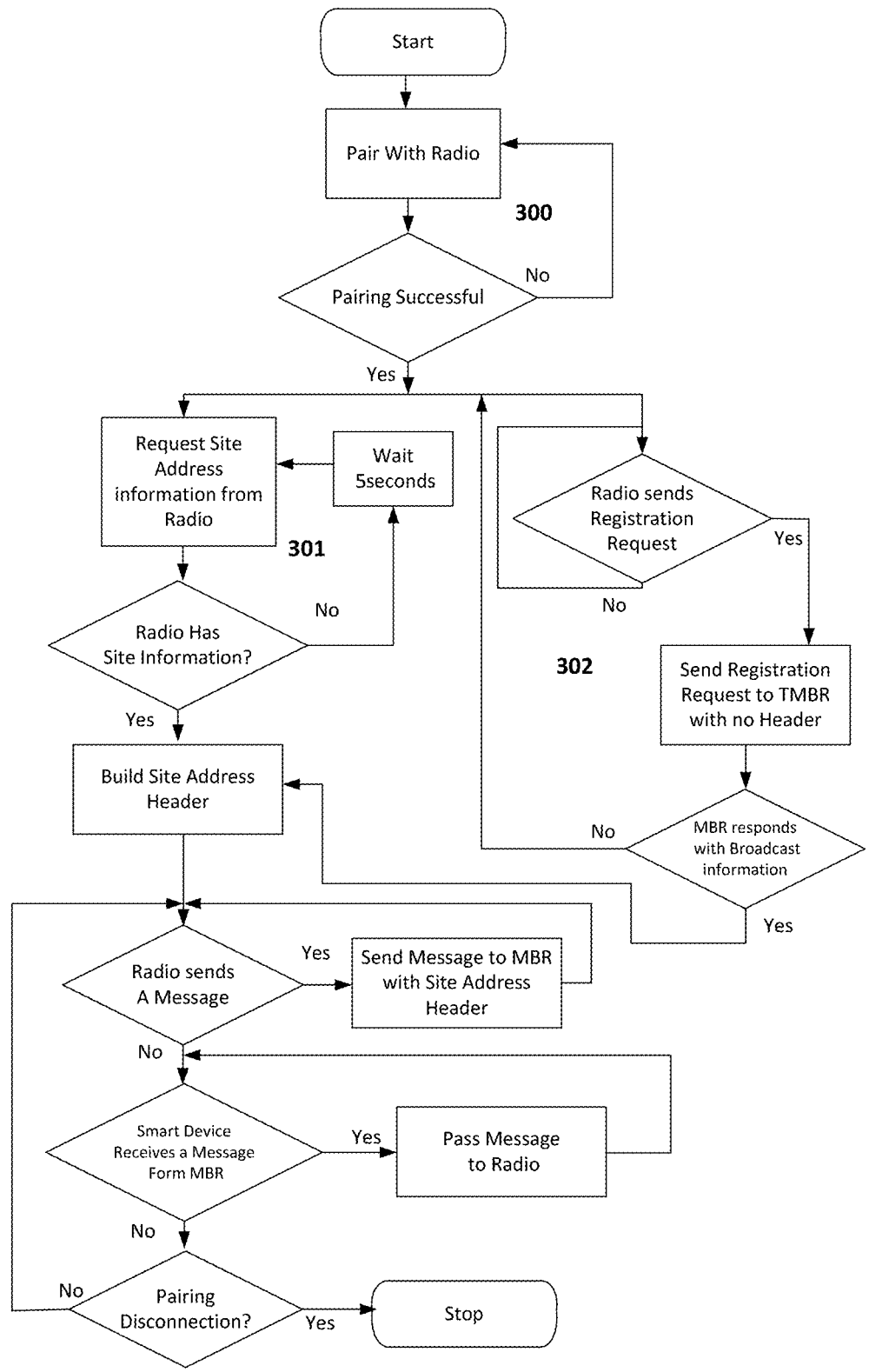
FIG. 18 is a flow diagram describing the operation of the application associated with the terminal.

FIG. 18 shows a detailed flow diagram for the application 404 that operates on a smart device associated with a P25 terminal. Following the start of the application, it will seek to connect 300 to the terminal device. This connection can occur via a number of methods as is well known in the art but here we assume Bluetooth. If the connection is not successful the attempt will repeat until it is.

Once connection is complete, two things could occur depending upon whether or not the associated terminal 400 is already registered with the P25 network. The application will establish control channel ID information from the attached terminal using from P25 broadcast information, 301. If the radio has no control channel base station ID information then the application will wait a period of time before making the same request.

If the terminal does respond with control channel base station ID information the application will build a header packet which contains the unique P25 identity of the control channel base station 201. From here on, any message the terminal sends to the application will have the header attached and then sent to the MBR. Equally, any messages received by the MBR will be passed directly to the terminal and processed.

Alternatively, if the terminal has not detected any broadcast information which identifies the base station control channel then it may send a registration request, 302. This registration request is sent directly to the MBR which responds with the ID for a default control channel base station or a preferred control channel base station. Given the response information including broadcast data, the application now has sufficient information to create a header and proceed as normal in future.

Figure 19A:
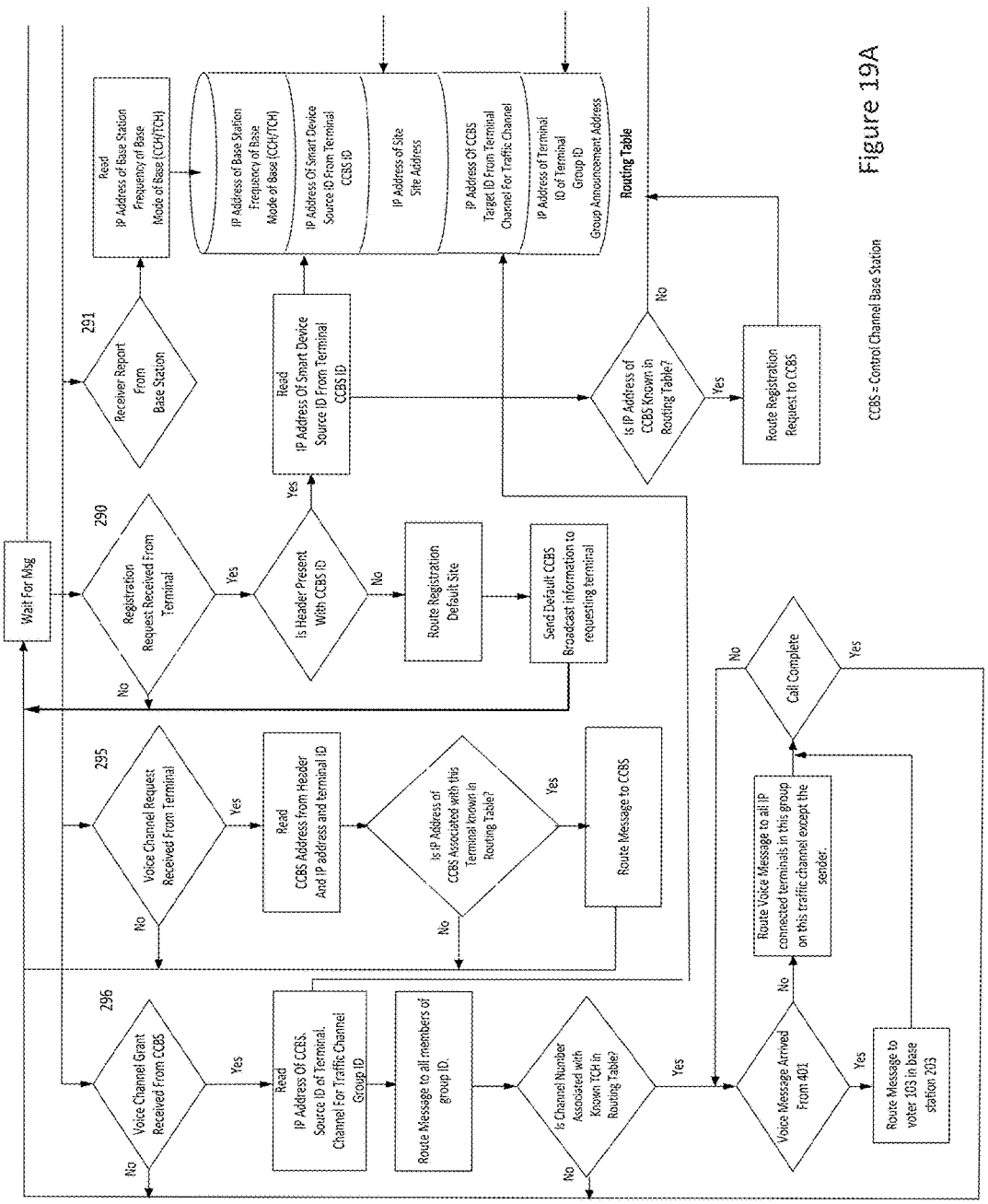
FIGS. 19A and 19B are flow diagrams illustrating the operation of a Trunked Multi-Bearer Router.
Figure 19B:
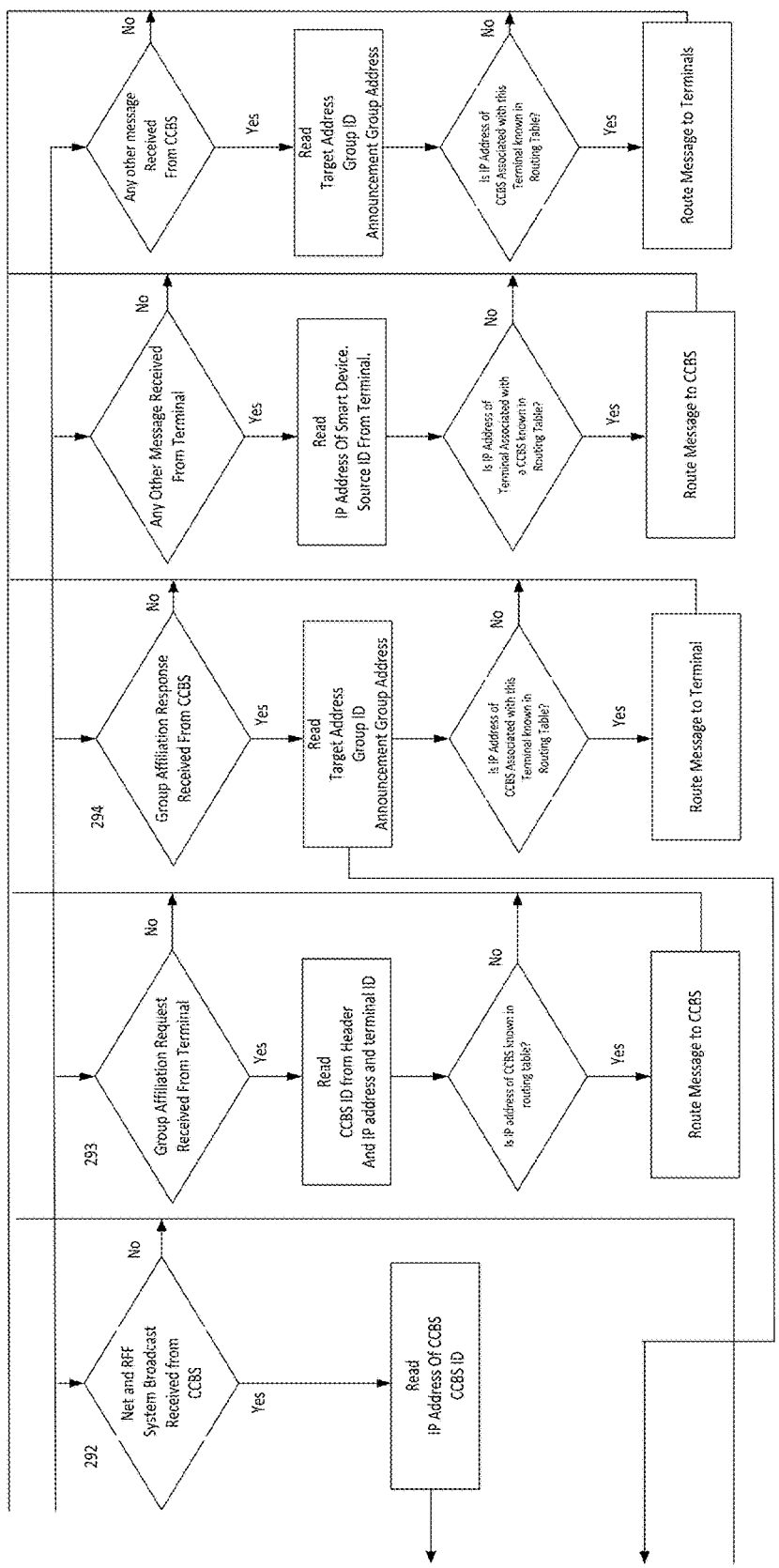

FIGS. 19A and 19B are a detailed flow diagram of the MBR for a trunked LMR system. Initially the MBR is waiting for a message to arrive. It processes various messages differently with a view to building up the required routing table to enable correct connectivity of devices. If the MBR receives 290 a registration request then it will first establish if the request is preceded by a header identifying the control channel base station ID which the device is seeking to communicate with. If the header is not present then the message is routed to a default control channel base station and the default control channel base station ID is sent back to the terminal.

If the registration request is preceded by a header identifying the control channel base station ID then the unique ID of that base station is stored in the lookup table. Next, the table is checked to see if an IP address matching that control channel base station ID is known. If it is then the registration request is sent to that control channel base station using its known IP address. If is it not known then the MBR simply waits for the next message to arrive. It may optionally respond to indicate the control channel base station ID is unknown.

If the MBR receives 291 a Receiver Report from another base station on the system then the table is updated to record the IP address of that base station, its operating frequency and the mode of the base station either control channel or traffic channel. The mode can be used to shorten the search algorithm required when seeking to match a control channel base station ID versus its IP address.

If the MBR receives 292 either NET or RFSS System broadcast messages from a control channel base station then the IP address of the sending base station along with the unique P25 ID of that base station is exacted and used to update the table.

If a Group Affiliation Request is received 293 from the terminal then the IP address and source ID of the terminal are read. The unique P25 ID of the control channel base station is read from the header. If a known IP address existing in the table matching that P25 ID then the message is routed to that control channel base station.

If a group affiliation response is received 294 from a control channel base station then the target ID of the terminal is read. The routing table is used to verify the IP address of the terminal. The Group ID is also added to the table and this terminal ID/IP address is associated with the group. Having extracted the relevant routing information the group affiliation response is sent onto the terminal/application.

If a voice channel request is received 295 from the terminal then the control channel base station ID is read from the header. This is checked against the routing table to establish the IP address of the control channel base station. The IP address of the smart device associated with the terminal is extracted along with the source ID of the terminal and this is added to the routing table.

If a voice channel grant is received 296 from a control channel base station then the IP address of the control channel base station, the terminal ID, the channel to which the grant has been assigned and the group ID are extracted. The channel grant is then routed to the IP address of the smart device associated with the terminal ID and to all the terminals that are members of this group. This is achieved by extracting from the routing table, the terminal ID's affiliated with the Group ID and IP addresses associated with each of those terminal IDs.

Next, a check is made to establish if the traffic channel number is known in the routing table. If it is, the IP address of that traffic channel is extracted using for routing. Voice messages arriving from an IP connected terminal such as 401 are routed to the voter in the traffic channel base station. In this case that's voter 103 in base station 203. Voice messages arriving from the IP address of the traffic channel base station are routed to all IP connected terminals in this group with the exception of the sender. The channel number is used to establish the IP address of the traffic channel to which this voice call has been assigned. The routing of the call continues until the call is complete.

FIG. 20 illustrates an example of a routing table for clarity. A terminal with ID 123 is paired with a smart device with IP address xxx.16.254.1. This multi-bearer system is currently on channel 9 using group ID 17 and it is registered with control channel base station ID A4397/2CC/8A/2/(1/2500).

Channel 9 is the channel number of the traffic channel base station with IP address xxx.16.254.21 operating on 171 MHz which is currently serving Group ID 17. Is also has a unique identifier A4397/2CC/8B/2/(1/2509).

When communicating with a control channel the terminal ID 123 will communicate with the control channel base station with Unique ID A4397/2CC/8A/2/(1/2500) that has IP address xxx.16.254.20. It is operating on 170 MHz and is identified as channel 1.

With reference to FIG. 1, while moving from the P25 site 74 to the LTE site 71, the multi-bearer unit 70 begins transmitting P25 information over both bearers simultaneously. In this case the implementation of the multi-bearer unit exists on a smart device connected to a terminal. These streams of information 73 and 80 converge at a voter according the assignment of the trunked controller 103 which selects on a packet by packet basis the best information to pass onto the core network or in general terms: the destination.

Within the multi-bearer device a P25 call can be established as normal over the RF interface. At the same time, the processing hub can establish an IP connection to the voter 103 located inside base station 203. This IP connection is established over any IP capable bearer with sufficient bandwidth to carry the information. In this case we connect over an LTE or 4G cellular network via a cellular tower through an IP network to the voter 103.

Figure 21:
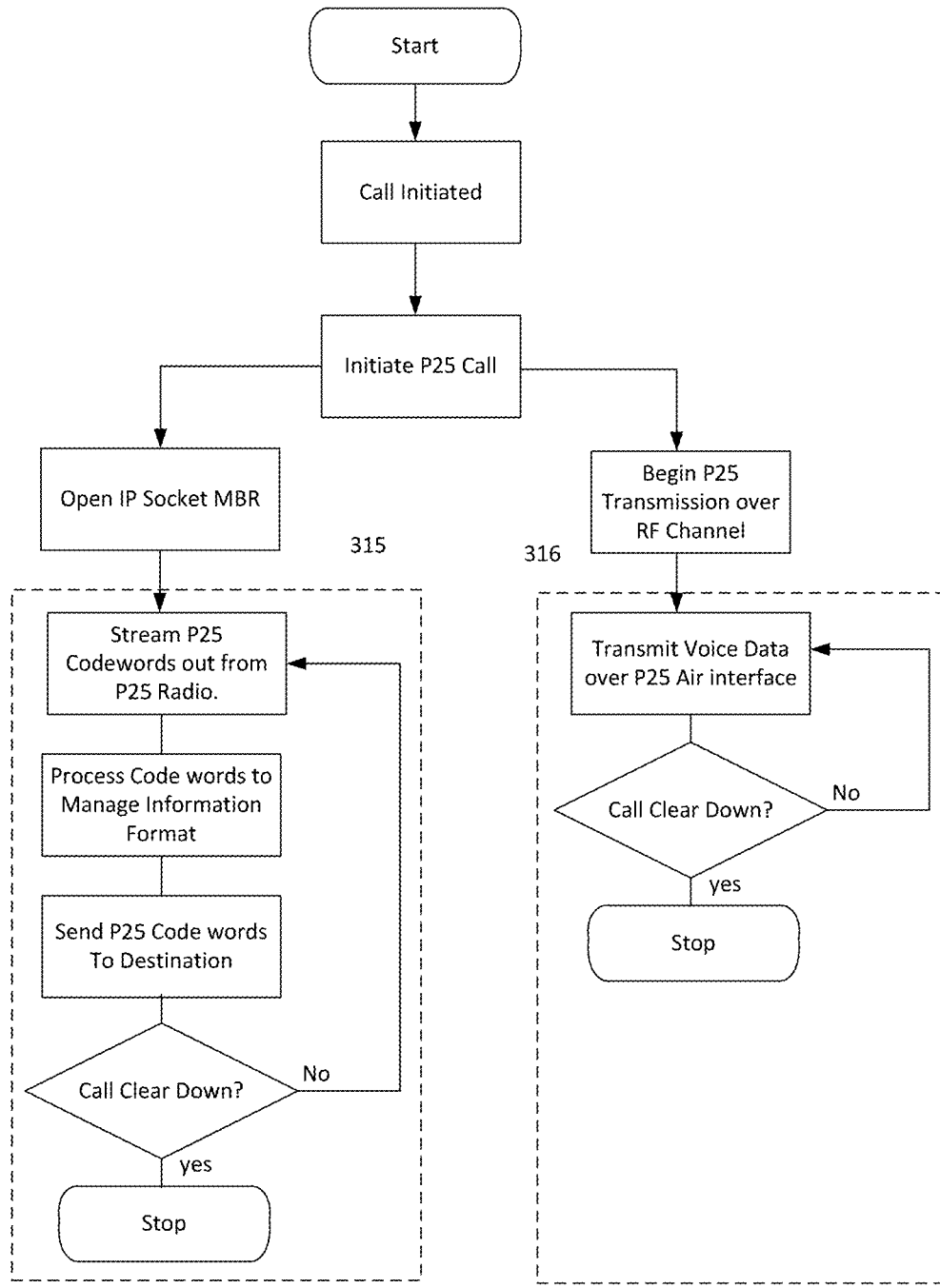
FIG. 21 is a flow diagram showing the initiation of multiple P25 flows from a terminal.

FIG. 21 details a flow diagram for the transmission of voice. Once a voice call is initiated, the application 404 will send the voice packets to the MBR that will then be routed 315 to the correct base station. Voice information is then continually sent until the call is cleared down. The terminal may also send the voice information via RF, which continues in parallel 316 until such time the call is cleared down. Here we assume that a call is to be initiated across both bearers simultaneously. Initially the system is waiting until a call starts.

Figure 22:
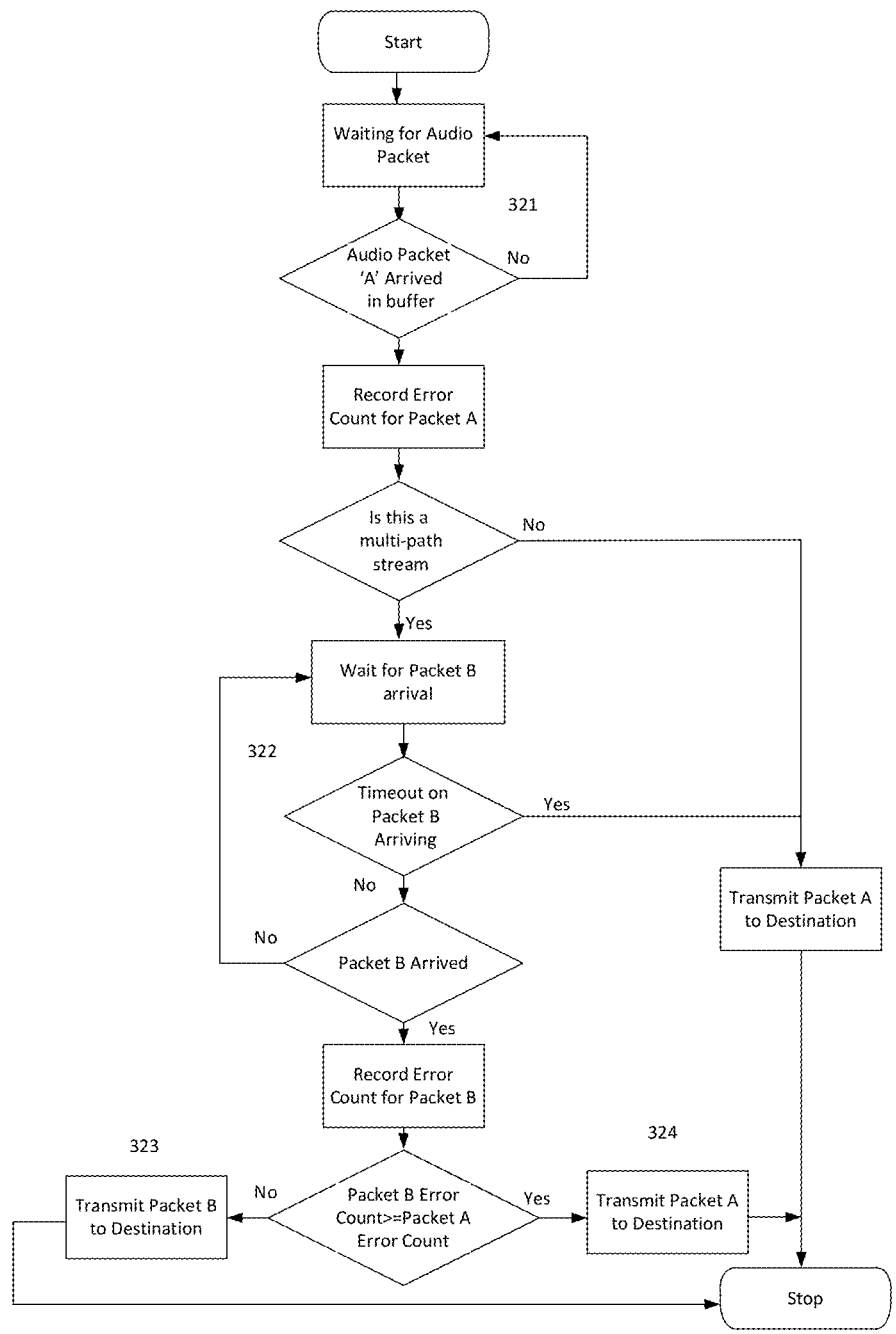
FIG. 22 is a flow diagram showing the operation of voting.

FIG. 22 illustrates the operation at the voter 103 contained within base station 203. The voter is seeing P25 packets arrive from both the RF path via a decoding base station and via an IP path over a cellular wireless bearer. Consider this on a packet by packet basis. Initially the voter is simply waiting for a packet to arrive, until an Audio Packet A arrives 321 in the buffer. The system will record the error count for Packet A. It will need this later for the purpose of deciding which is the best packet. If the system is not configured for voting then implicitly it means there is only one path and so Packet A will be passed to the destination. If the system is configured for voting then it means another packet is expected. As a result the system waits a predetermined time T for a packet B to arrive 322. If packet B fails to arrive then packet A will simply be sent to the destination.

Assuming a packet B does arrive then the system records the error count for that packet. An assessment is now made of packet A versus packet B. If packet B error count is larger than or equal to the packet A then packet A is sent 323 to the destination and the process for the current packet stops. If however packet B error count is less than packet A error count then Packet B is sent 324 to the destination. In an alternative form one can configure the voter to prefer a particular path if present and if above a certain level of quality defined by the error count or signal conditions or criteria more generally than error count.

Figure 23:
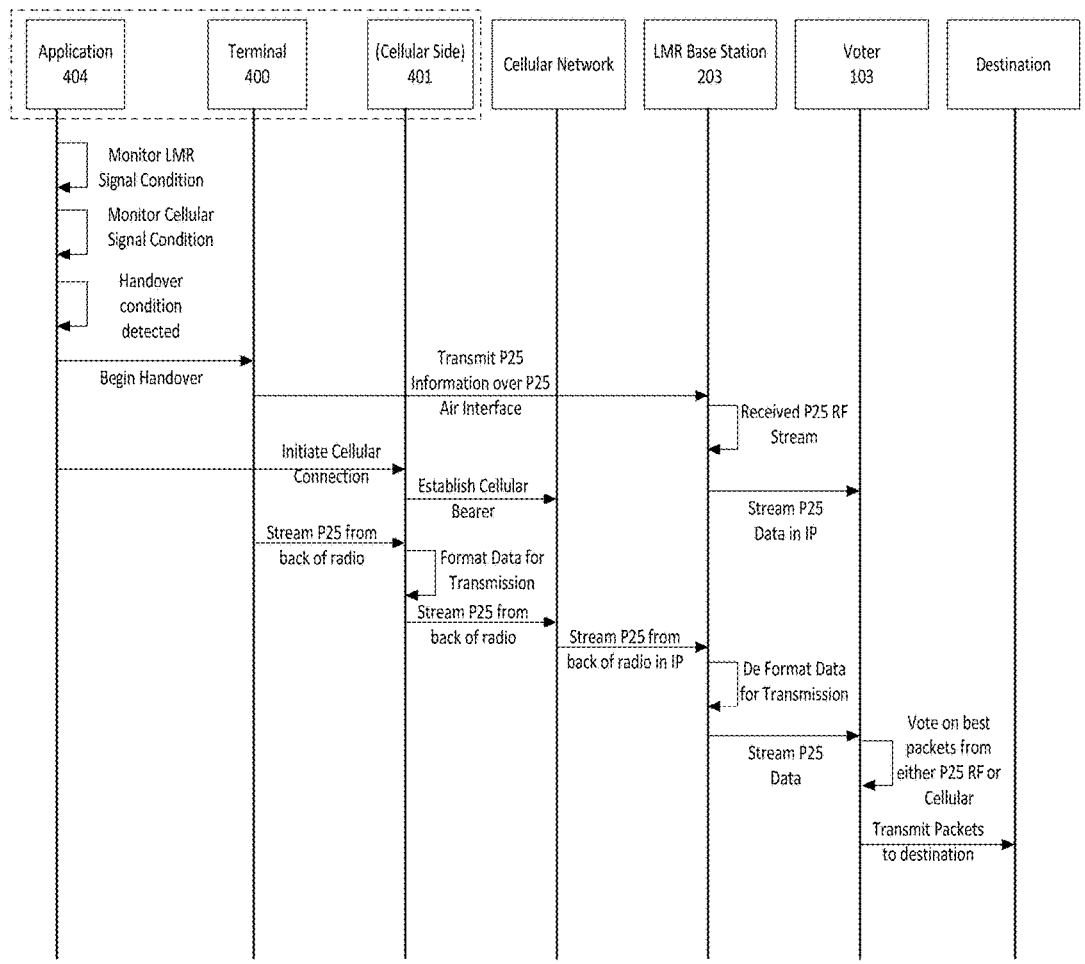
FIG. 23 is a sequence diagram showing the establishment of multiple P25 flows for handover.

FIG. 23 illustrates an example where a handover condition may be occurring. In this case, we assume a case where we are already working on a P25 RF channel. Periodically, both the P25 LMR signal condition and the cellular signal condition are monitored by the application 404. In this case, we detect a situation where the LMR signal is becoming weak. The P25 transmission over RF continues but at the same time we initiate a cellular connect to establish a suitable cellular bearer to support an IP pipe. Given the establishment of this IP pipe, the P25 data stream begins streaming from the digital interface of the radio to be transported to a base station, 203 (via the TMBR, 410) capable of decoding the format of this information. Both the data stream from the P25 RF and the duplicate data stream via the IP path are passed to the voter which selects best packets each time duplicates arrive. Those packets not considered best are simply discarded. The best packets from the two streams are then sent onto the destination.

Figure 24:
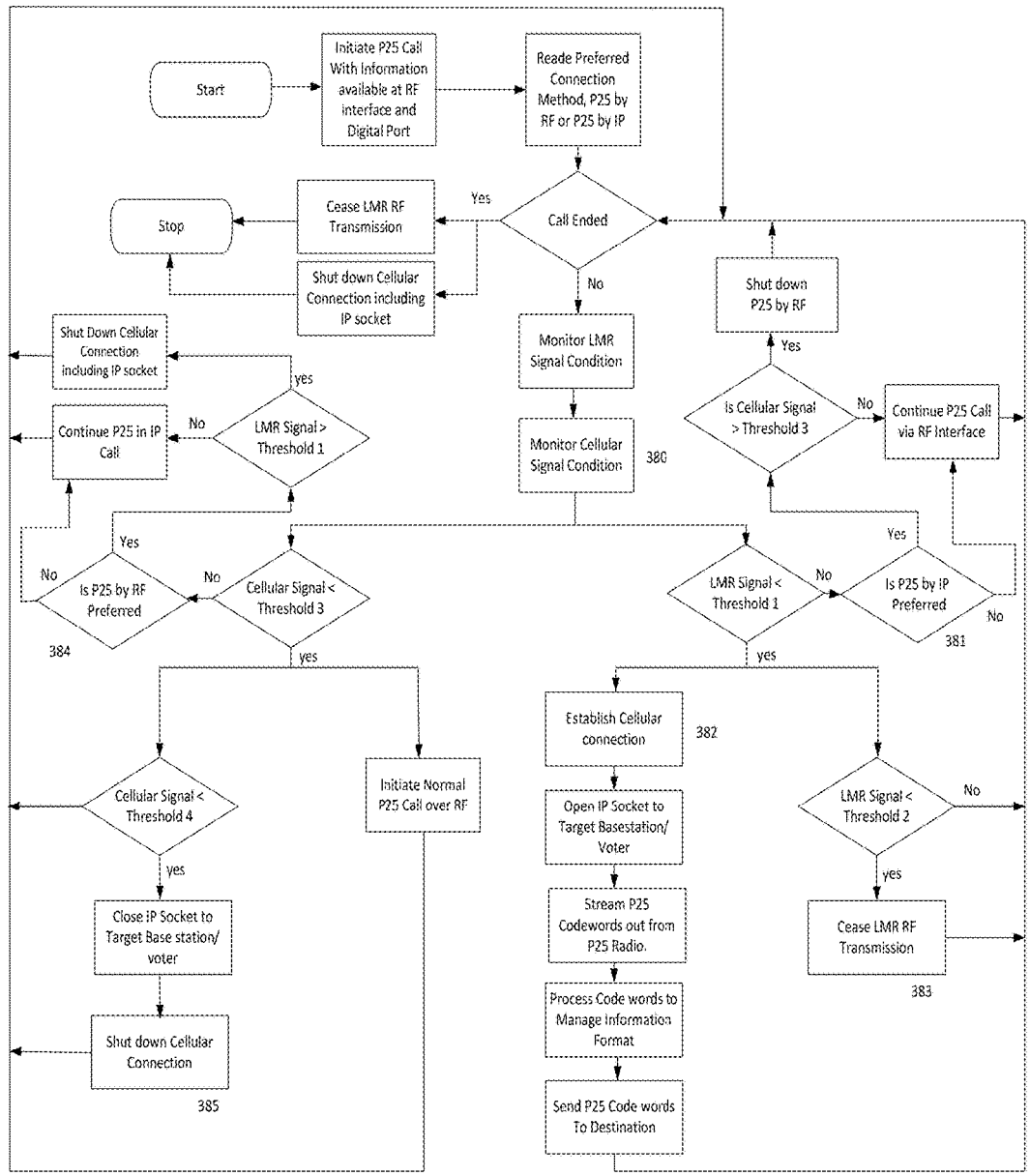
FIG. 24 is a flow diagram illustrating the approach to handover.

FIG. 24 illustrates a more detailed analysis of a handover process. A call has been initiated with the P25 information available for transmission at both the RF port and the digital port on the radio. If the call is ended at any time then the P25 RF transmission and the cellular connection are both shut down. In other words the call is simply ended. If the call is not ended then the condition of the LMR signal and the condition of the cellular signal is monitored 380. This typically means measuring signal strength but can also mean measuring the current bit error rate or block error rate or any other call control criteria.

Given the above measurements a number of decisions may be made. If the LMR signal strength is above a threshold 1, then it means the current LMR communication is very strong and could simply continue. A typical value for threshold 1 might be −90 dBm. A check is made 381 to see if P25 through IP is the preferred method of sending LMR. If it is not then the P25 over RF call simply continues. If P25 through IP is preferred then a check is made to see if the Cellular signal needed to support P25 through IP is above a threshold 3. If it is, it means the cellular call is strong hence P25 over RF can be shut down. If the cellular signal is less than threshold 3 then we continue the P25 call over RF.

If the LMR signal strength is less than threshold 1 however, then it may indicate edge of cell. Given this, and assuming cellular is available, a cellular connection must be established 382 in parallel. As a result, an IP pipe is opened to the target base station. Given this pipe, the P25 data is streamed to the remote base station. The result of this action is that two duplicate versions of the P25 stream are now arriving at the voter.

If the LMR signal strength drops below another threshold 2 then there is no point in continuing the RF transmission because we are out of range. A typical threshold may be −120 dBm. If the LMR signal remains above threshold 2 but below threshold 1 then the LMR transmission can continue. The terminal is hovering around the edge of range of the LMR system.

In the case of a cellular connection having been established, the signal condition must also be monitored. If the cellular signal is below a threshold 3 then a normal P25 call via RF is initiated. If the P25 RF call is already operating then there is no need to start a new one. A typical value for threshold 3 might be −80 dBm. If the cellular signal is above threshold 3 then we firstly check 384 to see if P25 via RF is preferred. If it is not then we continue with the cellular call. If P25 via RF is preferred then a check is made to see if the LMR RF signal is above a threshold 1. If it is not we continue with the P25 over IP call supported by cellular. If it is above threshold 1 then we shut down the P25 over IP call and shut down the cellular connection supporting it.

In parallel, if the cellular signal has dropped below a threshold 4 which might typically be −100 dBm. If the signal is above threshold 4 then the cellular connection is maintained. If the signal drops below threshold 4 then the cellular call is terminated 385 because the terminal is out of range.

Figure 25:
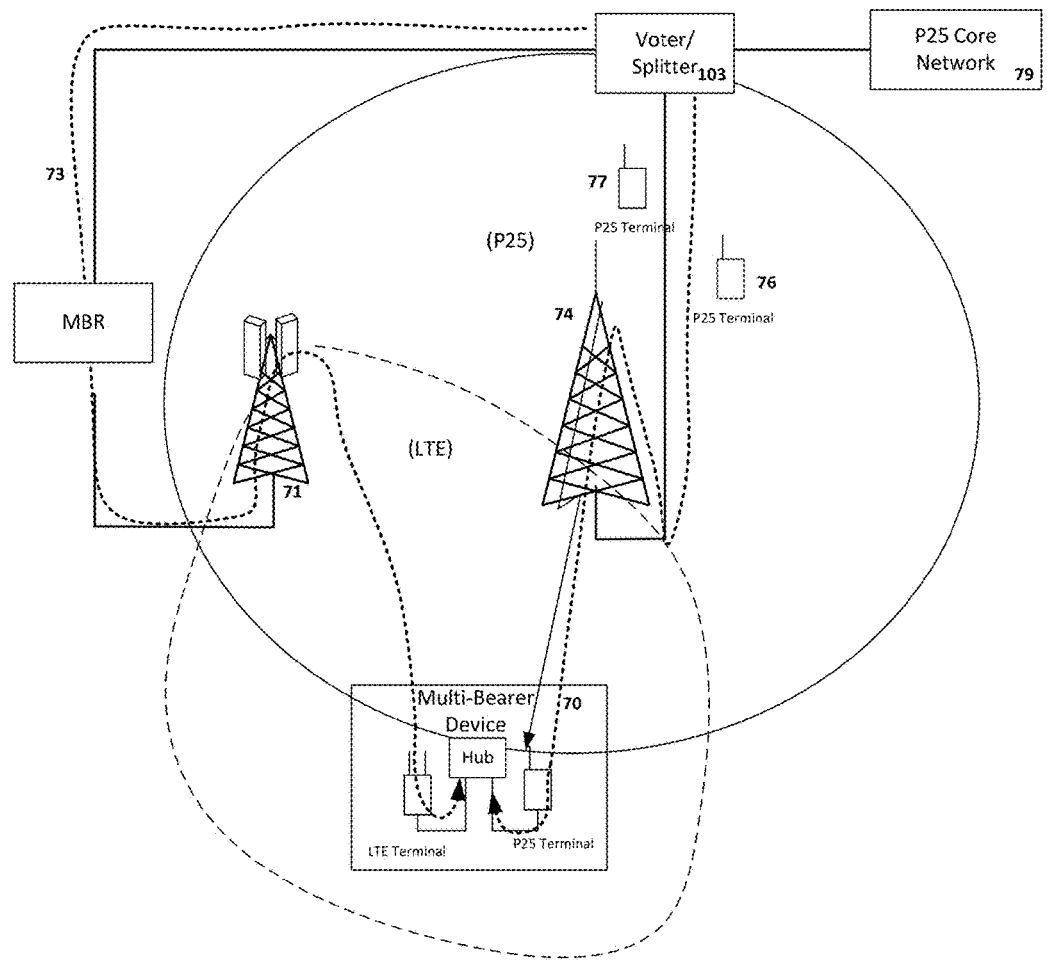
FIG. 25 shows information flow in downlink.

FIG. 25 illustrates an example where the communication is in the downlink as opposed to the uplink. In this case the source of information may be any device capable of producing P25. In this case the source is a P25 core network. The P25 information arrives at a voter 103 which also contains a splitter. This unit opens a standard P25 RF communication via a P25 control channel base station and simultaneously begins streaming the same P25 information in an IP pipe over an established cellular connection. The parallel streams of information arrive at the multi-bearer device where they are received over both cellular and P25 RF. A voting algorithm shown in FIG. 7 is applied. The destination in this case is an application.

Figure 26:
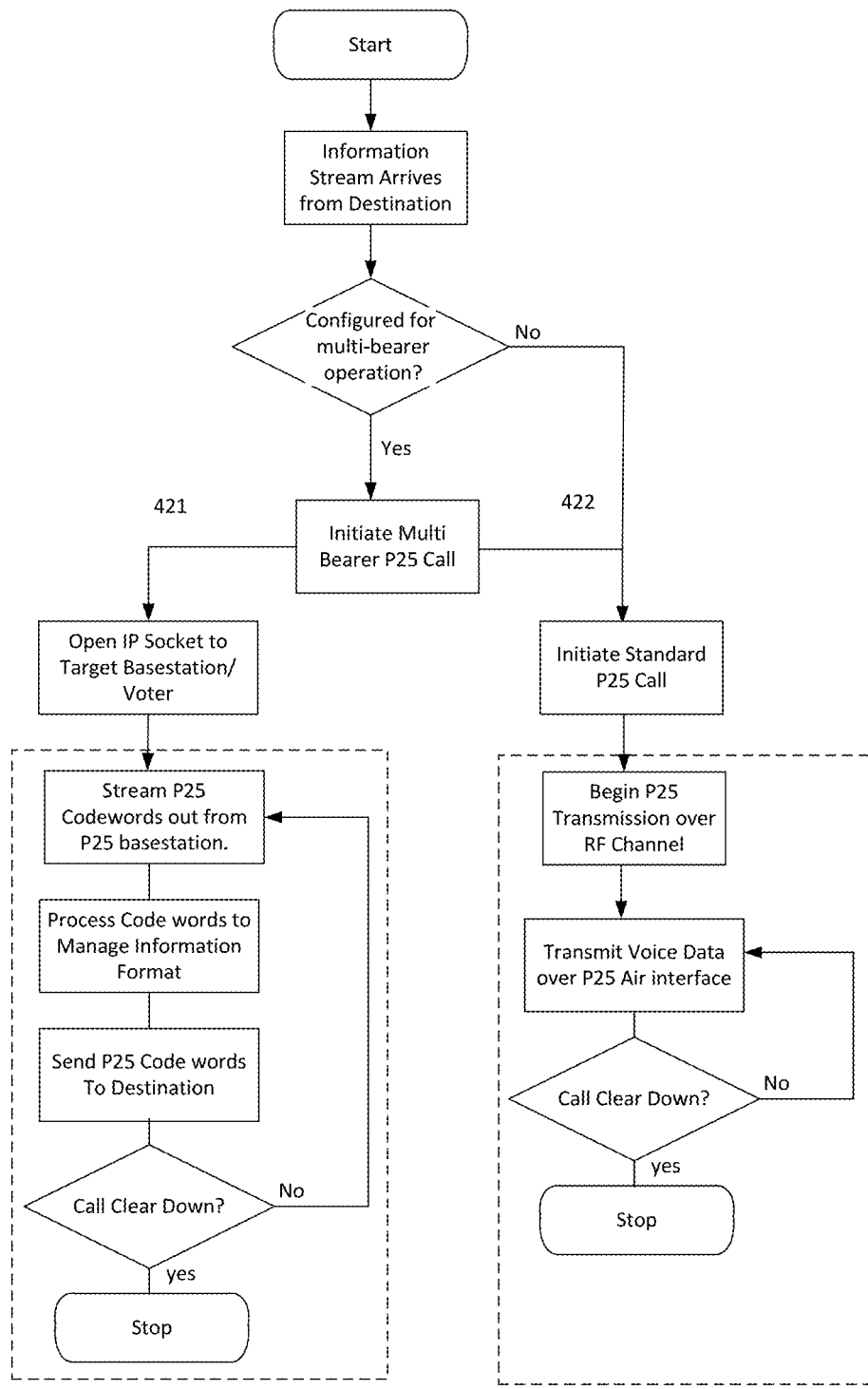
FIG. 26 is a flow diagram showing the operation of the splitter.

FIG. 26 shows a flow diagram for the splitter 103 during downlink. If the splitter device is configured for multi-bearer operation then parallel communication paths 421, 422 are established over cellular and P25. The information is then transmitted simultaneously over both paths.

Figure 27:
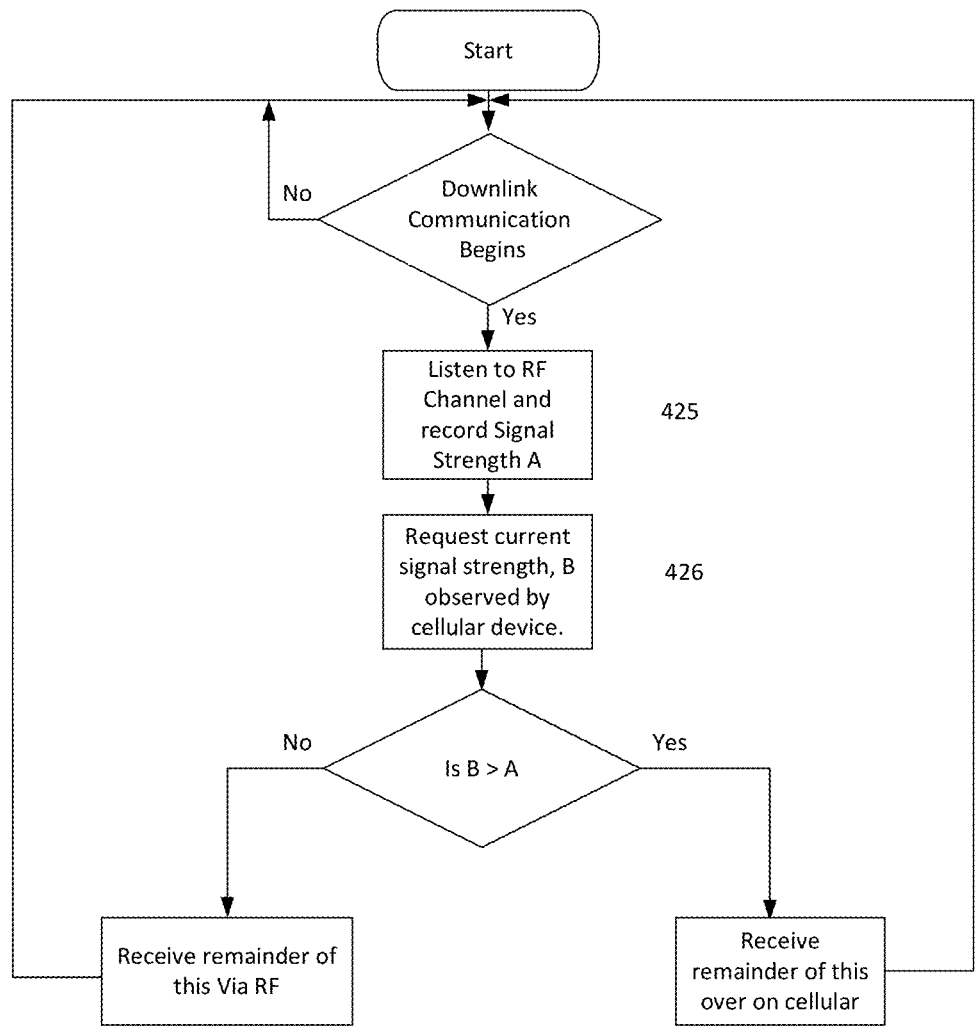
FIG. 27 is a method of voting at the multi bearer terminal.
Figure 28:
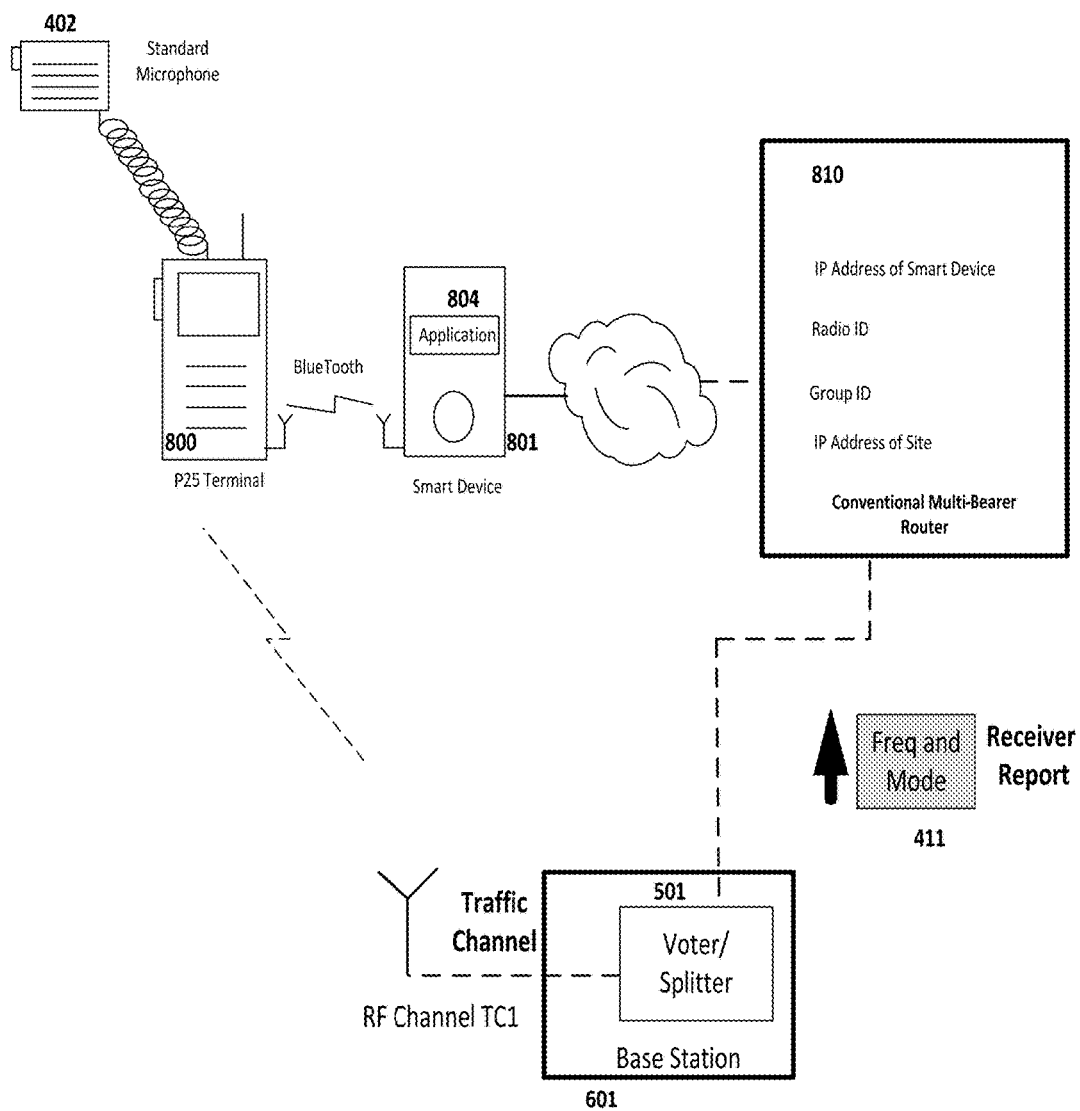
FIG. 28 is a system diagram illustrating the conventional multi-bearer router.

At the terminal side, there are a number of ways of receiving downlink information. In one form the terminal can implement the same process as the uplink voter. In this form the terminal would make packet by packet decisions on information flow. An alternative form is shown in FIG. 27. Typically, LMR terminals are capable of scanning or voting. In the case of scanning, the terminal will measure signal strength or some other quality factor on each RF channel and lock onto the first one it sees. In a voting form the terminal measures signal strength of each channel and selects the best channel. Other forms are possible.

In this case, one of the channels is now an IP path via a cellular device. Techniques of scanning and voting can be applied across the LMR channels and cellular channels. FIG. 27 details an example. Here, upon the start of a downlink communication, the algorithm measures 425 the signal strength of the RF path and records it as A. It then measures 426 the signal strength of the cellular path, B. The best path is then selected whereupon the remainder of the voice over is received by that one path. In an alternative form, we could use a rule that always prefers the use of cellular if packets are present.

In the example of FIG. 27, one RF channel and one cellular channel is measured. Clearly, multiple RF channels can be assessed and multiple IP paths. Further, acceptable cellular signal strengths may be different to LMR. Such differences are taken into account with scaling. Further, any form of signal quality measure can be used including but not limited to bit error rate, message error rate and audio quality.

Referring back to FIG. 1 illustrates the main components of a system to enable seamless migration between P25 and IP over LTE. The multi-bearer device 70 is moving out of the LMR coverage area into the coverage of a cellular LTE base station 71. Whilst moving from the P25 coverage area to the LTE coverage area the multi-bearer unit 70 begins transmitting P25 information over both bearers simultaneously. These streams of information 73 and 80 converge at a voter, 101 which selects on a packet by packet basis the best information to pass on to the core network or in general terms the destination. It should be noted the multi-bearer terminal 70 highlights the key components of a multi-bearer device, such as shown in FIG. 4.

Conventional LMR systems do not require control channels but otherwise have many similarities to trunked systems as described above. The functions of the multi bearer terminal and multi bearer router in an integrated IP and conventional LMR system are therefore similar but less complex.

Figure 29:
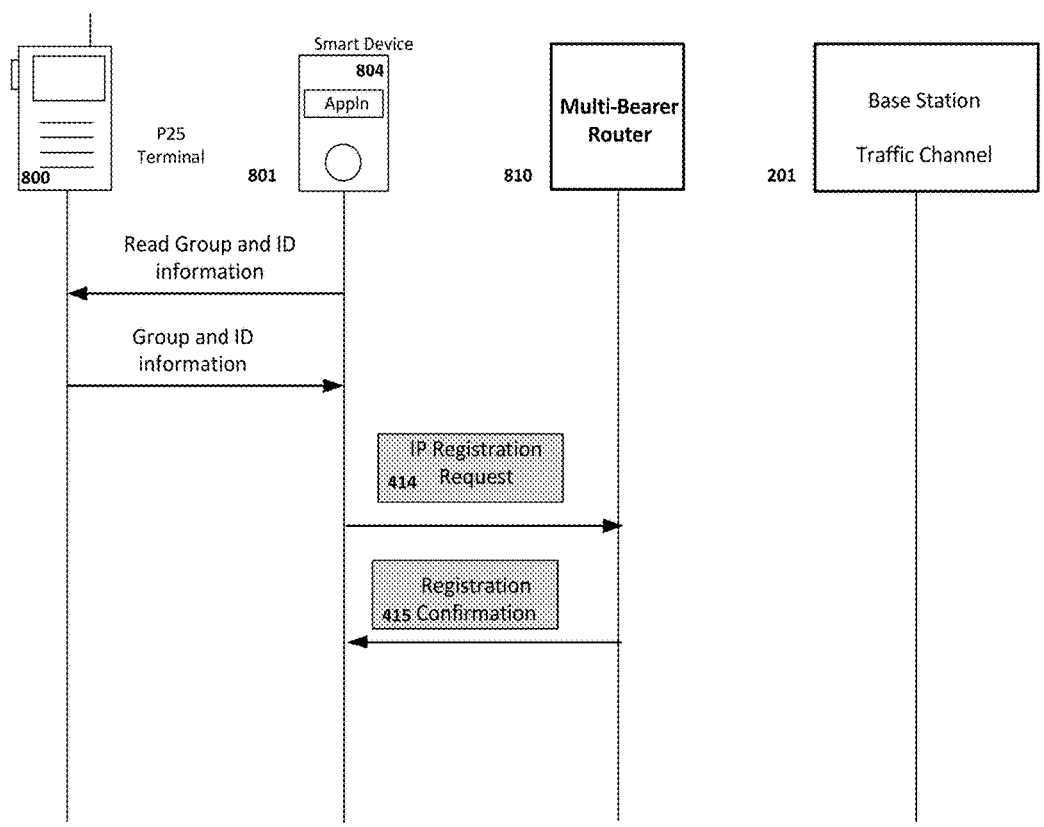
FIG. 29 is a sequence diagram illustrating conventional smart device registration.

FIG. 29 schematically shows a multi bearer router MBR 810 in a conventional LMR system. The MBR has the IP address of a smart device 801 and the radio ID of the associated P25 terminal 800. Further, the MBR has the IP address of the traffic channel base station 601. Given this information it can route messages via IP between a traffic channel base station 601 and the terminal 800. In this example the MBR also knows the Talk Group ID of which radio 800 is a part. The MBR builds up this information into tables that can be used to route traffic. Alternatively the MBR may be configured manually.

FIG. 29 also identifies the Receiver Report message 411 that is preferentially broadcast over the IP network by all base stations in the system. In this case it is sent from the base station 601. This message identifies the operating frequency of the base station 601 and the mode of the base station. In a conventional radio case this is a Traffic Channel. This message is periodically sent by all base stations on the network and can be received by any other network component including the MBR.

FIG. 29 shows a process of registration for a terminal in an integrated conventional LMR and IP network. It is necessary the multi-bearer system made up of devices 800 and 801 and 804 register their presence with the MBR 810. Primarily this is to enable the MBR to establish the IP address and group membership relevant to that system so that information can be routed to/from it.

Upon switch on or upon connection, the system made up of radio 800, smart device 801 and application 804 running on smart device 801 must register with the MBR 810. To accomplish this, the application 804 creates a registration message 414 containing; the radio ID, the Talk group IDs of which this radio is a part, and the IP address of the smart device. The purpose of this message is to register the smart device IP address with the MBR, rather than for Land Mobile Radio registration. The IP address of the MBR can be known prior by the application 804. Upon arrival of the header 414 at the MBR the information is extracted and used to build a routing table associating Talk Group IDs with Radio IDs and the IP addresses of those Radio IDs. Also associated with the Talk Group ID are the IP addresses of the base stations sending information about those groups.

Figure 30:
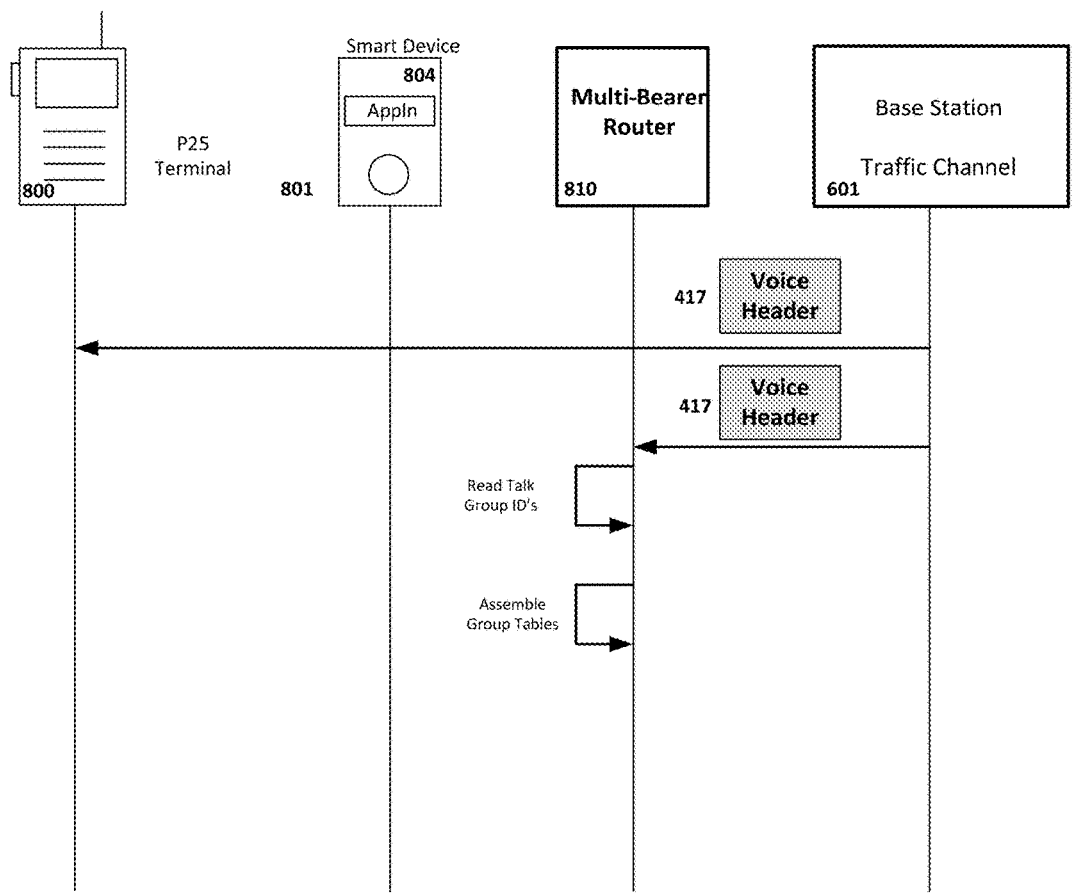
FIG. 30 is a sequence diagram showing automatic router configuration.

FIG. 30 shows an automatic method for building up the routing table in the MBR, 810. In P25 operation, the voice header 417 contains the Talk Group ID of the target radios for which the communication is destined. The base station is sending the voice streams via both the RF path and over IP which means it is received by the MBR 810. Having received the voice header 417, the MBR now knows there must exist a Talk Group ID of that described in the header 417. As a result, the MBR can start building a table entry for that Talk Group ID whether or not a Radio ID has registered with the MBR via IP yet.

Figure 31:
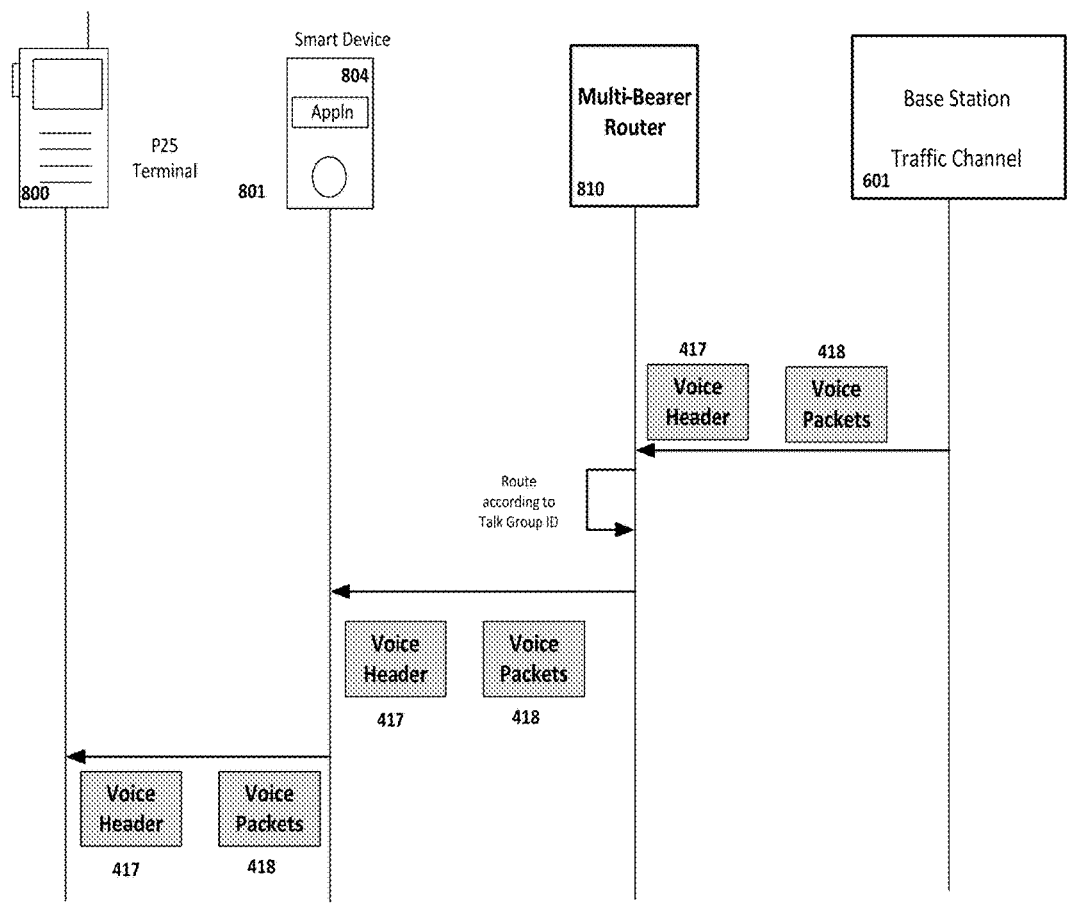
FIG. 31 is a sequence diagram showing flow of conventional uplink voice packets.

FIG. 31 illustrates a sequence diagram for the downlink voice stream in a conventional LMR and IP system, focussing solely on the stream via the IP path. Voice header 417 and voice packets 418 are sent to the MBR 810. The MBR uses its routing table to pass the voice stream onto the application 804 operating on smart device 801. The application then passes the stream across to the radio 800 which can operate according to its usual behaviour e.g. to unmute.

Figure 32:
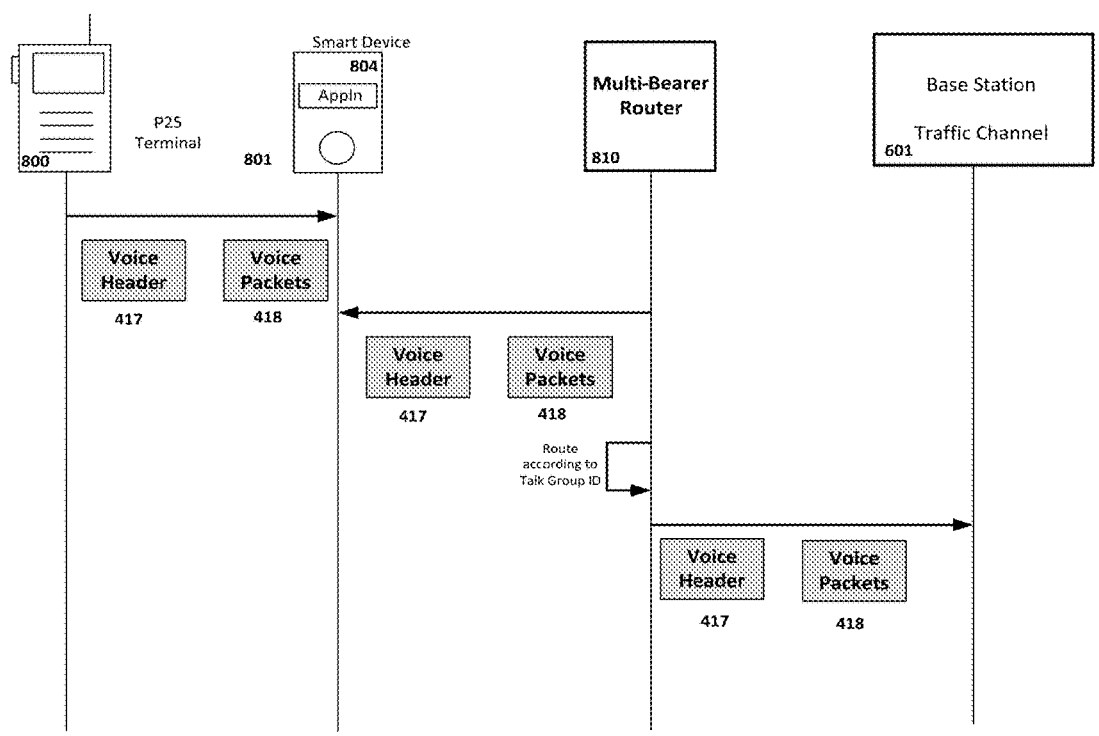
FIG. 32 is a sequence diagram showing flow of conventional downlink voice packets.

FIG. 32 indicates an uplink voice stream. The radio 800 transmits a voice header 417 and voice packets 418 via both RF and IP. It sends the stream across to the smart device 801 where upon the application 804 re-transmits the messages 417, 418 to the MBR 810. The MBR uses its routing table to send the stream to the relevant base station or base stations 601.

FIG. 33 illustrates a table of example device identities. In this table, we assume the MBR is located at IP address xxx.20.254.100. This represents a default address to which the smart devices of the multi-bearer system can communicate. One such multi-bearer system is represented by the radio1, smart device 1 pairing identified as Radio ID 123, IP address xxx.20.254.1. Further examples include radio 2, 3 and 4 associated with smart devices 2,3 and 4 respectively. Radio ID 123 is a member of group 18.

The table of FIG. 33 also shows three base stations. One such example is located at IP address xxx.16.254.21 and is operating on 171 MHz for traffic and associated with Talk Group 17.

FIG. 34 illustrates a routing table with two groups 17 and 18. Each row in the table identifies the base station IP addresses associated with each Talk Group ID and the smart device IP addresses associated with each Talk Group ID.

Talk Group ID 17 is associated with a single base station operating on IP address xxx.16.254.23. This base station is operating on frequency 171 MHz. Further, the IP addresses of the smart devices associated with this group include xxx.20.254.3 which is connected to Radio ID 125 and xxx.20.254.4 associated with Radio ID 126.

Talk Group ID 18 is associated with a two base stations operating on IP addresses xxx.16.254.21 and xxx.16.254.22. These base stations operate on frequencies 171 MHz and 172 MHz respectively. In is a normal mode of operation in Land Mobile Radio for terminals to scan across multiple frequencies and selecting the channel frequency which are in range. The IP addresses of the smart devices associated with this group include xxx.20.254.1 which is connected to Radio ID 123 and xxx.20.254.2 associated with Radio ID 124.

Figure 35A:
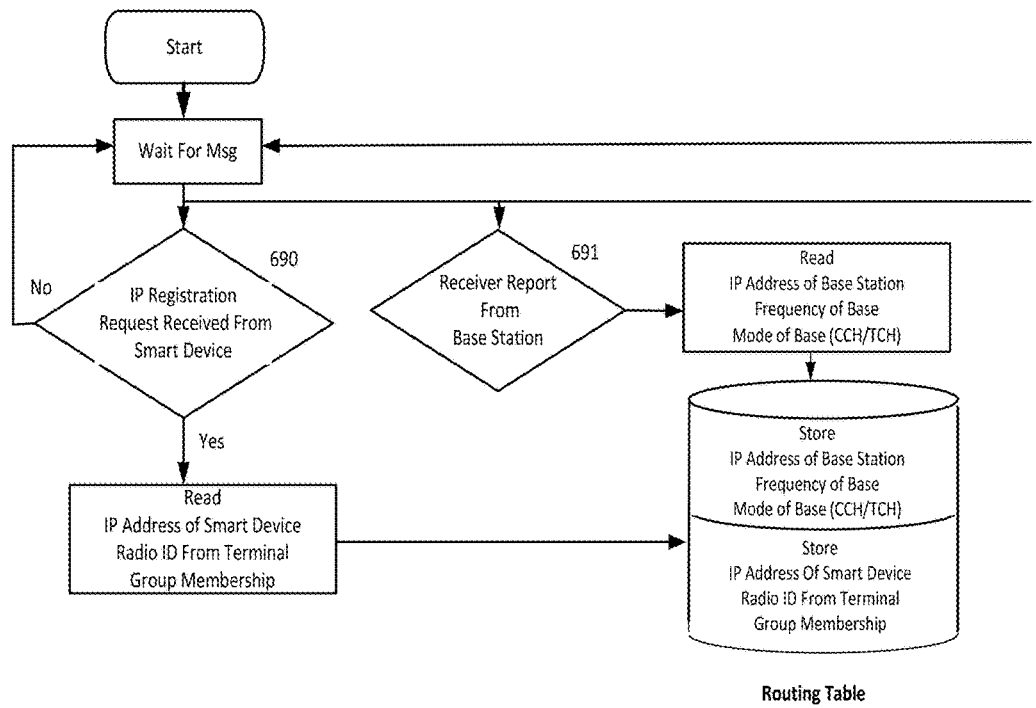
FIGS. 35A and 35B are flow diagrams for the conventional router.
Figure 35B:
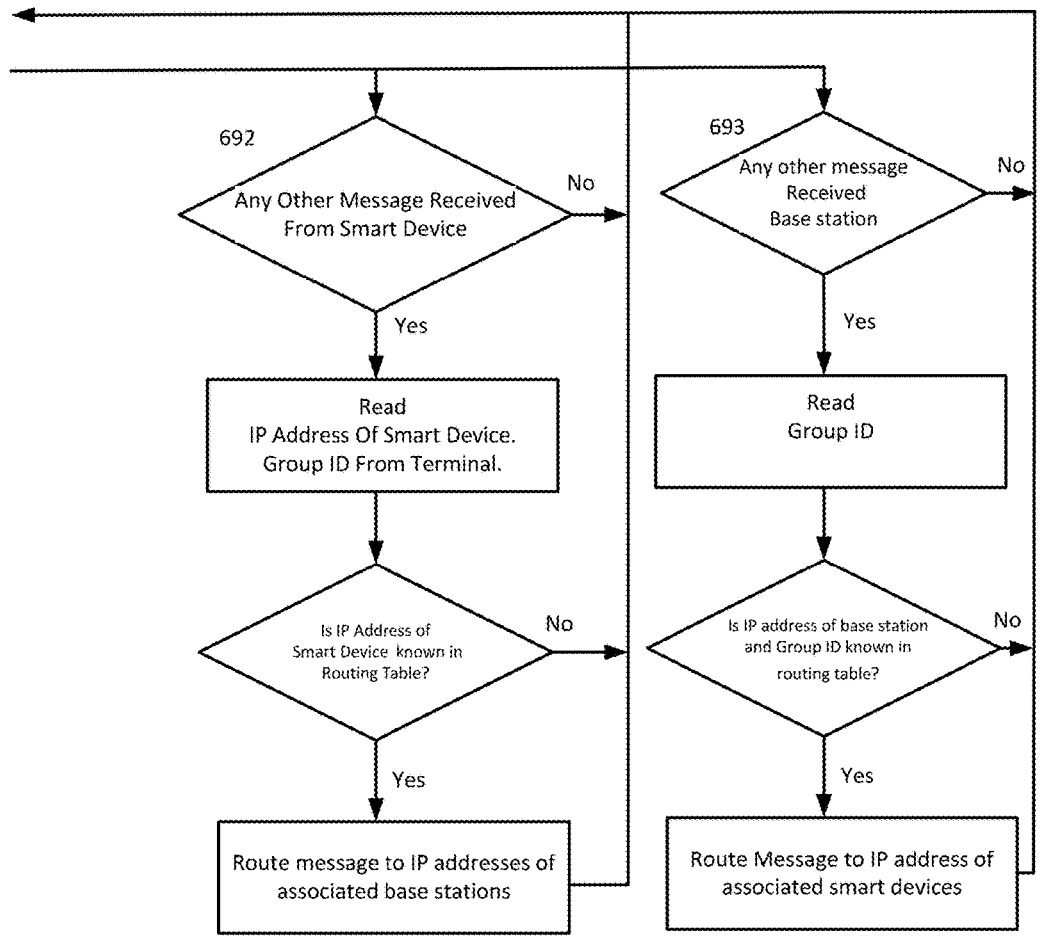

FIGS. 35A and 35B are a flow diagram illustrating processes in the MBR for a conventional LMR network integrated with an IP network. By default, the MBR is waiting for a message to arrive. If a registration request arrived 690 from a smart device connected to a radio then the MBR extracts the IP address of that device along with the Radio ID and Group IDs. This information is stored in the table.

If a receiver report arrives 691 from a base station then the MBR extracts the IP address, frequency information and mode of the base. It should be noted that in a conventional radio context, the mode will only be traffic as opposed to control.

If any other message arrives 692 from any other smart device then a check is made to establish if that device is registered. If it is registered then its Group ID is used to route its messages to all base stations or smart devices associated with that group. As a result all members of the group whether they are connected via IP or through RF connection via a base station will receive the transmission.

If any other message arrives 693 from a base station then the group ID of the message is read and used to enable routing of that message to all other devices associated with that group. As a result all members of the group whether they are connected via IP or through RF connection via a base station will receive the transmission.

Figure 36:
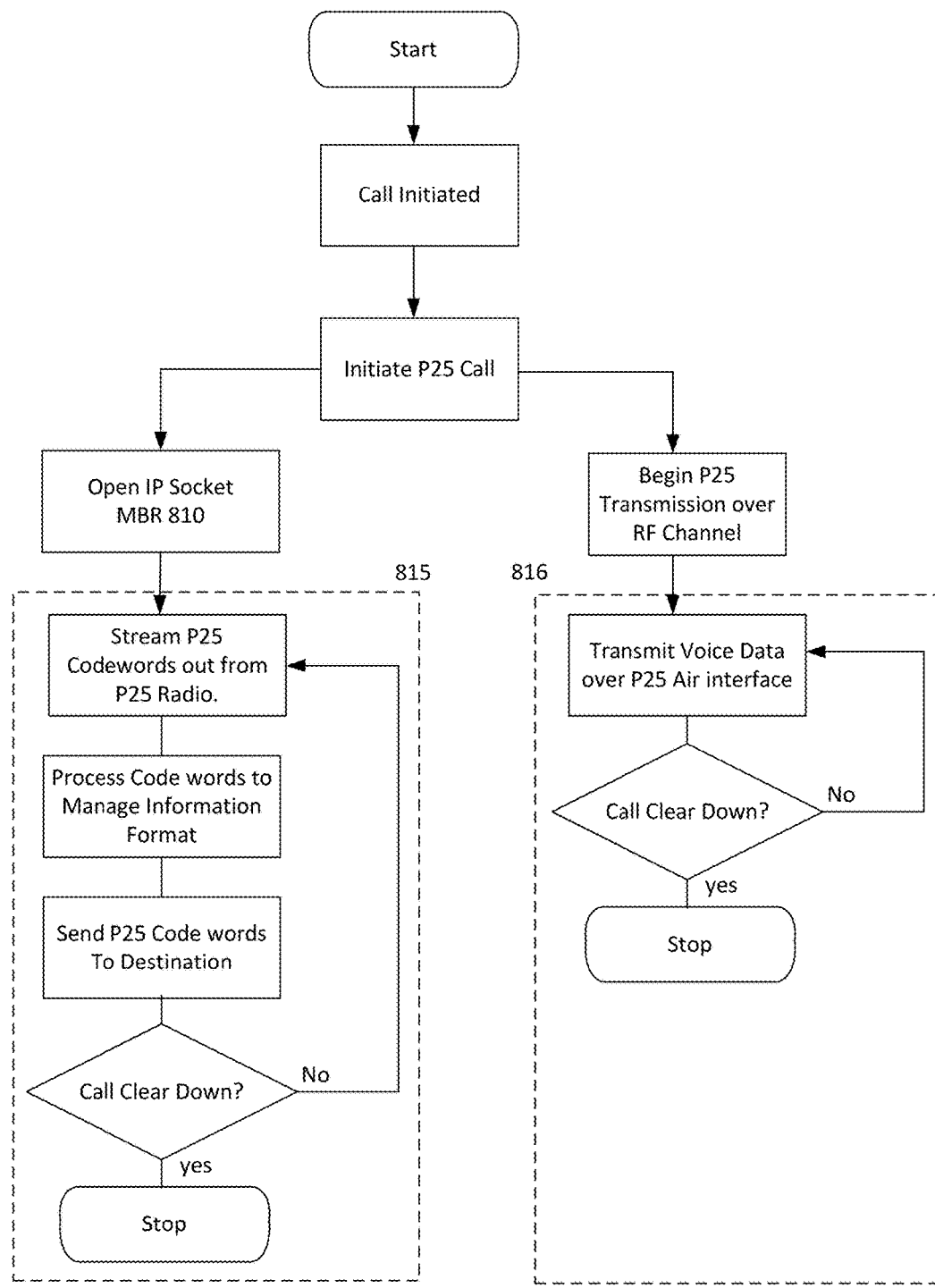
FIG. 36 is a flow diagram illustration uplink communication.

FIG. 36 details a flow diagram for the transmission of voice calls in a conventional system, similar to calls in a trunked system. Initially the system is waiting until a call starts. Once a voice call is initiated, the application 404 will send the voice packets to the MBR that will then be routed 815 to the correct base station. Voice information is then continually sent until the call is cleared down. In FIG. 69, the terminal sends the voice information via RF. That continues in parallel 816 until such time the call is cleared down. In this case a call is to be initiated across both bearers simultaneously. Initially the system is waiting until a call starts.

The stream of P25 code words is continuously streamed out of the radio, processed according to a format required by the destination then transmitted across the IP path to the remote voter. Simultaneously a normal P25 call is established over the RF interface and the same P25 codewords are transmitted over RF. This parallel transmission over both P25 RF and P25 in IP continues until the call is cleared down as normal.

The method by which the voter receives and uses the data streams in a trunked context was described earlier with reference to FIGS. 22 to 24. This part of the process is the same for a conventional LMR network.

Figure 37:
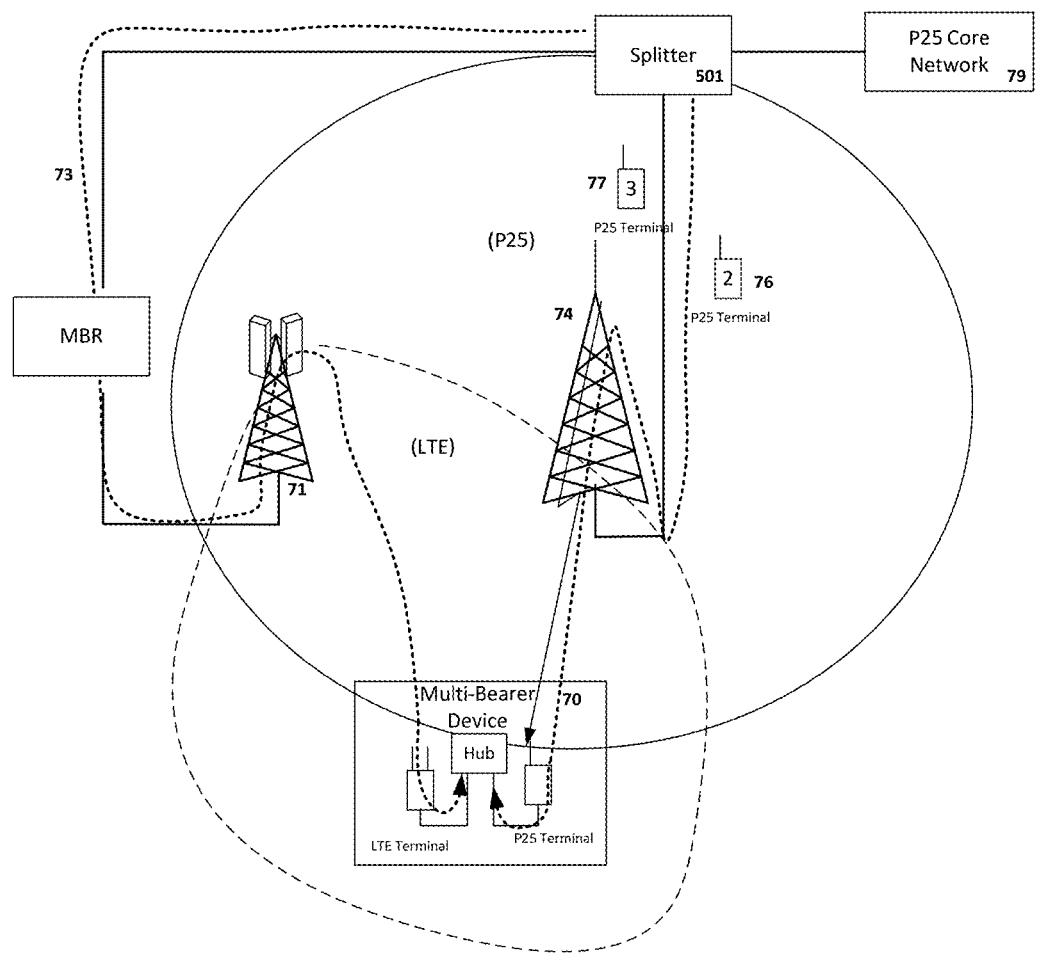
FIG. 37 is a system illustration of downlink communication.

FIG. 37 illustrates an example where the communication is in the downlink as opposed to the uplink. In this case the source of information may be any device capable of producing P25. In this case the source is a P25 core network. The P25 information arrives at an information splitter which is part of a voter. This unit opens a standard P25 RF communication via a P25 site and simultaneously begins streaming the same P25 information in an IP pipe over an established cellular connection. The parallel streams of information arrive at the multi-bearer device where they are received over cellular and P25 RF together. The destination in this case is an application. A voting algorithm such as that shown in FIG. 7 can be applied. Alternatively the terminal can use very simple rules for example; if RF signal is present then receive the rest of the over using that path. Alternatively, if P25 in IP is present then receive the rest of the over via that path.

Figure 38:
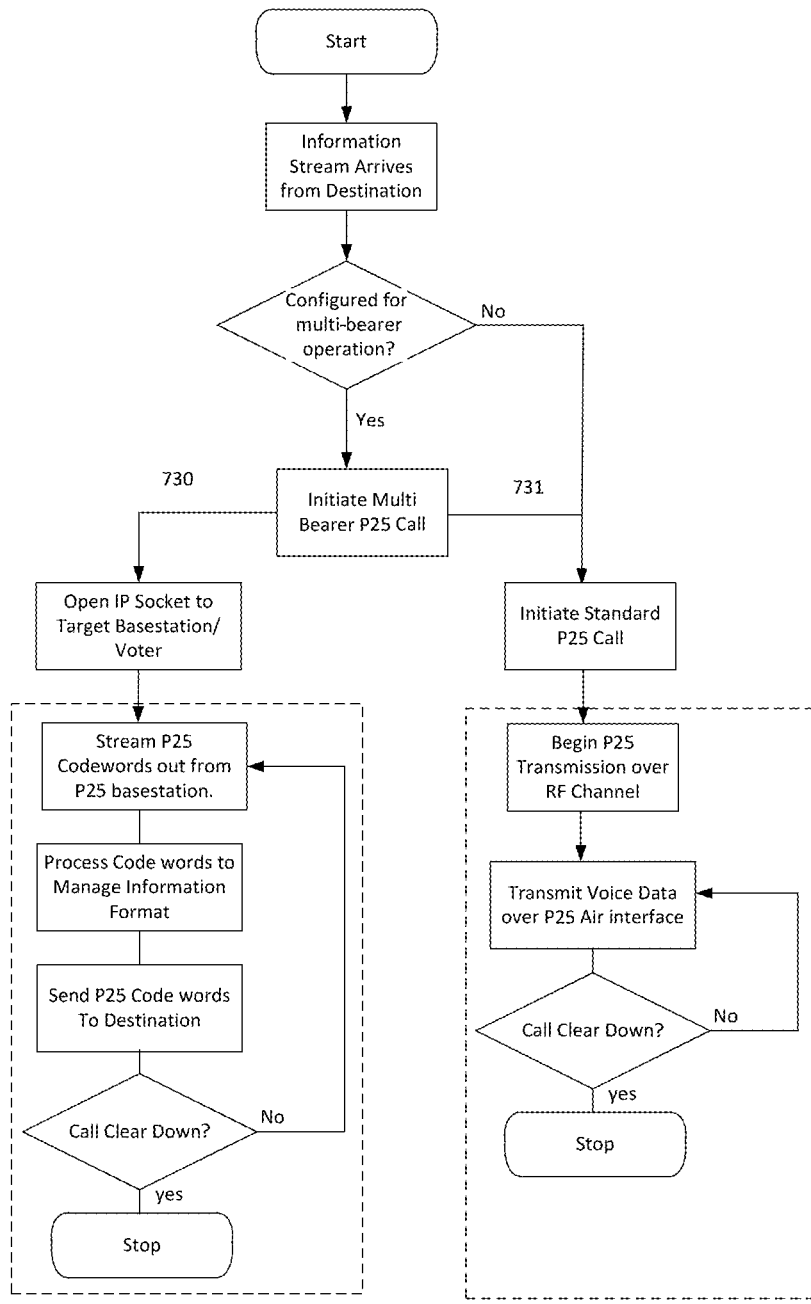
FIG. 38 is a flow diagram of splitter operation.

FIG. 38 shows the flow diagram for downlink. If the splitting device is configured for multi-bearer operation then parallel communication paths can be established over cellular and P25. The information is then transmitted simultaneously over both paths 730, 731.

At the terminal side, there are a number of ways of receiving downlink information. In one form the terminal can implement the same process as the uplink voter as described in FIG. 36. In this form the terminal would make packet by packet decisions on information flow. An alternative form is shown in FIG. 15 involving scanning. Typically, LMR terminals are capable of scanning or voting. In the case of scanning, the terminal will simply measure signal strength on each RF channel and lock onto the first one it sees. In a voting form the terminal measures signal strength of each channel and selects the best channel.

In this case, one of the channels is now an IP path via a cellular device. We can apply similar techniques of scanning and voting here across the LMR channels and cellular channels. FIG. 10 details an example. Upon the start of a downlink communication, the multi-bearer terminal measures the signal strength of the RF path and records it as A. It then measures the signal strength of the cellular path, B. The best path is then selected whereupon the remainder of the voice over is received by that one path.

Figure 39:
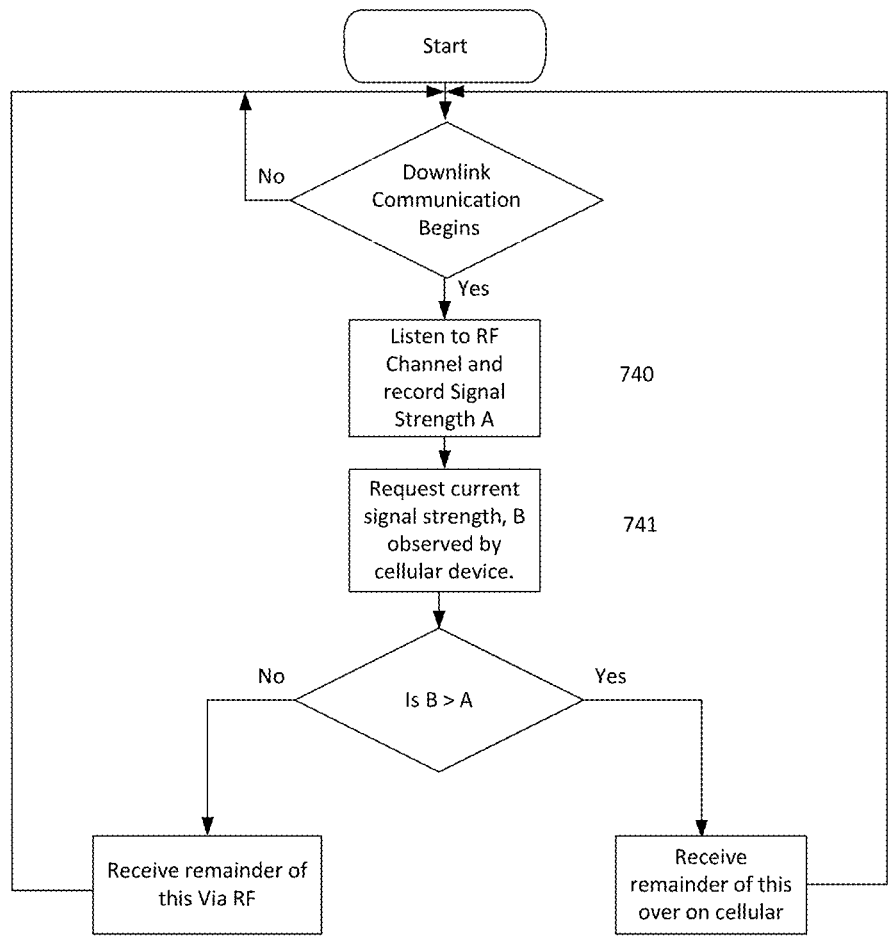
FIG. 39 is a flow diagram showing downlink stream selection at multi-bearer hub.

In the example of FIG. 39, one RF channel and one cellular channel are measured 740, 741. Multiple RF channels can be assessed and also multiple IP paths. Further, it is important to note that acceptable cellular signal strengths may be different to LMR. Such differences are taken into account with scaling. Further, any form of signal quality measure can be used including but not limited to bit error rate, message error rate and audio quality.

The invention claimed is:

1. A method of operating a router in a multi bearer radio system having an LMR wireless bearer and an IP wireless bearer, including:
   establishing device data in the router having an LMR ID and an individual IP address for each of a plurality of multi bearer devices in the system,
   establishing bearer site data in the router having an LMR ID and an individual IP address for each of a plurality of LMR bearer base stations in the system and an individual IP address for each of a plurality of IP bearer base stations in the system,
   receiving IP messages from the LMR bearer base stations including information to establish whether the LMR base station provides an LMR control channel for the multi bearer devices, and
   receiving IP messages from the multi bearer devices via IP bearer base stations including information to establish which LMR bearer base station is currently providing an LMR control channel for the multi bearer device.

2. The method according to claim 1 further including:
   receiving a message from an LMR bearer base station in the form of LMR content encapsulated as IP data, and
   transmitting the message to an IP bearer base station for further transmission to one or more multi bearer devices.

3. The method according to claim 1 further including:
   receiving a message from an IP bearer base station in the form of LMR content encapsulated as IP data, and
   transmitting the message to an LMR bearer base station for RF transmission to one or more multi bearer devices.

4. The method according to claim 1 wherein the device data includes a talk group ID for one or more of the multi bearer devices.

5. The method according to claim 1 further including:
   receiving an LMR registration request from a multi bearer device via an IP bearer base station, and
   transmitting the LMR registration request to an LMR base station which provides a control channel for the device.

6. The method according to claim 5 further including:
   receiving an LMR registration response from said LMR base station which provides a control channel, and
   transmitting the LMR registration response to said multi bearer device via an IP bearer base station.

7. The method according to claim 6 further including:
   receiving a group registration request from a multi bearer device via an IP bearer base station, and
   transmitting the group registration message to an LMR base station which provides a control channel for the device.

8. The method according to claim 7 further including:
   receiving a group registration response from said LMR base station which provides a control channel,
   transmitting the LMR registration response to said multi bearer device via an IP bearer base station, and
   establishing a group registration ID for said multi bearer device in the device data.

9. A method of group communication between multi bearer devices in a communication system using both conventional LMR base stations and broadband IP base stations, including:
   receiving LMR ID, group ID and IP address information from each of the multi bearer devices,
   storing the LMR ID, group ID and IP address information from the multi bearer devices in a router,
   receiving LMR ID and IP address information from each traffic channel base station in the system,
   storing the LMR ID and IP address information from the base stations in the router,
   routing group communications between multi bearer devices in a common group according to:
   a) the stored IP address of each multi bearer device in the group and the stored IP address of each traffic channel base station which serves multi bearer devices in the group, and
   b) the stored LMR ID of each multi bearer device in the group and the stored LMR ID of each traffic channel base station which serves multi bearer devices in the group; and
   c) voting on messages at each traffic channel base station when the same message is received through both the LMR ID and the IP address of the station or the device.

10. The method according to claim 9 wherein the router identifies the IP addresses of the base stations through IP broadcast reports containing frequency of operation and mode.

11. A method of registration in a communication system using both trunked LMR base stations and broadband IP base stations including,
   initiating an LMR communication using a multi-bearer device capable of both LMR and IP communication,
   receiving broadcast information including the LMR identity of a control channel base station,
   using said broadcast information to establish a header packet to enable communication to the control channel base station,
   transmitting said header and LMR registration content, including LMR ID and IP address for the multi bearer device, from the multi-bearer device over an IP path to a router, transmitting identifying information from each LMR and IP base station in the system to the router, receiving said header and LMR registration content from the multi-bearer device at the router, using the identifying information from each base station to route the LMR registration content to the control channel base station, transmitting said LMR registration content from the control channel base station to a trunked controller, receiving a registration response from the trunked controller at the control channel base station, transmitting the registration response to the router, transmitting the response from the router to the multi-bearer device using the LMR ID and IP address of the multi bearer device, and voting between response messages at the control channel base station when the same message is received through both the LMR ID and the IP address of the station or the device.

12. The method according to claim 11 wherein the header is established through LMR broadcast information including the RFSS System Broadcast and Network Broadcast.

13. The method according to claim 11 wherein the router identifies the IP address of the control channel base station by receiving broadcast information regarding frequency of operation and mode of the station encapsulated in an IP packet.

14. A trunked radio communication system for users having radio equipment which provides both LMR and IP capability, including:
   a first network of base stations which provide LMR services to the users, having a control channel base station and a trunking controller, and
   a second network of base stations which provide cellular IP services to the users, having a router containing a table of LMR identities and corresponding IP addresses for individual user equipment,
   wherein the control channel base station sends and receives LMR control messages to and from users of the system through the first network, and
   the control channel base station sends and receives said LMR control messages to and from users of the system through the second network, and
   upon receiving the same message for a user through both the first and second networks each control channel base station votes to determine which of said same messages is sent to the user.

15. The system according to claim 14 wherein the control messages include requests and responses relating to registration, group affiliation and call setup.

16. The system according to claim 14 wherein messages from a user are sent to a base station serving the user in the first network, and also to a base station serving the user in the second network, and from said base station in the second network via the router to said base station in the first network, for a voting process.

17. The system according to claim 14 wherein messages to a user are sent via a base station serving the user in the first network, and also via the router to a base station serving the user in the second network, for a handover process.

18. A conventional radio communication system for users having radio equipment which provides both LMR and IP capability, including:
   a first network of traffic channel base stations which provide LMR services to the users, and
   a second network of base stations which provide cellular IP services to the users, having a router containing a table of LMR identities and corresponding IP addresses for individual user equipment,
   wherein the traffic channel base stations send and receive messages to and from users of the system through the first network, and
   the traffic channel base stations send and receive said messages to and from users of the system through the second network, and
   upon receiving the same message for a user through both the first and second networks each traffic channel base station votes to determine which of said same messages is sent to the user.

* * * * *